United States Patent
Ishii

(10) Patent No.: US 10,764,861 B2
(45) Date of Patent: Sep. 1, 2020

(54) AREA UPDATE PROCEDURE(S) FOR RADIO SYSTEM

(71) Applicants: Sharp Kabushiki Kaisha, Sakai, Osaka (JP); FG INNOVATION COMPANY LIMITED, Tuen Mun, New Territories (HK)

(72) Inventor: Atsushi Ishii, Vancouver, WA (US)

(73) Assignees: Sharp Kabushiki Kaisha, Sakai, Osaka (JP); FG Innovation Compan Limited, Tuen Mun (HK)

( * ) Notice: Subject to any disclaimer, the term of this patent is extended or adjusted under 35 U.S.C. 154(b) by 0 days.

(21) Appl. No.: 16/000,285

(22) Filed: Jun. 5, 2018

(65) Prior Publication Data

US 2018/0359722 A1   Dec. 13, 2018

Related U.S. Application Data

(60) Provisional application No. 62/516,586, filed on Jun. 7, 2017.

(51) Int. Cl.
*H04W 68/00* (2009.01)
*H04W 60/04* (2009.01)
(Continued)

(52) U.S. Cl.
CPC ......... *H04W 68/005* (2013.01); *H04W 60/04* (2013.01); *H04W 76/27* (2018.02); *H04W 8/02* (2013.01)

(58) Field of Classification Search
CPC . H04W 36/08; H04W 74/0833; H04W 76/27; H04W 12/04; H04W 36/0005;
(Continued)

(56) References Cited

U.S. PATENT DOCUMENTS 8,649,291 B2   2/2014 Wang et al.
8,867,455 B2   10/2014 Sambhwani et al.
(Continued)

FOREIGN PATENT DOCUMENTS

CA   2 698 798 A1   4/2009
WO   2009/046061 A3   4/2009

OTHER PUBLICATIONS

International Search Report and Written Opinion dated Sep. 25, 2018 in PCT application PCT/US2018/35987.
(Continued)

*Primary Examiner* — Joseph Arevalo
(74) *Attorney, Agent, or Firm* — Nixon & Vanderhye P.C.

(57) ABSTRACT

In one of its aspects the technology disclosed herein concerns a communications system comprising a radio access node (22) and a wireless terminal (26). The wireless terminal comprises receiver circuitry (40) and transmitter circuitry (44) as well as terminal processor circuitry (40). The receiver circuitry (40) is configured to receive, from the radio access node (22), a Radio Resource Control (RRC) message comprising information configuring a Radio Access Network-based (RAN-based) notification area. The terminal processor circuitry (40) is configured to initiate, in a case where the wireless terminal is in an inactive state, a RAN-based notification area update procedure upon the wireless terminal moving out of the configured RAN-based notification area. The information configuring the RAN-based notification area comprises one or more tracking area codes, each of the one or more tracking area codes being used to identify a tracking area.

16 Claims, 14 Drawing Sheets

(51) Int. Cl.
*H04W 76/27* (2018.01)
*H04W 8/02* (2009.01)

(58) Field of Classification Search
CPC ......... H04W 36/0011; H04W 36/0022; H04W 4/80; H04W 72/10; H04W 74/006; H04W 74/04; H04W 76/23; H04W 24/10
USPC ... 455/458, 426.1, 456.1, 435.1, 552.1, 436, 455/411, 439, 438
See application file for complete search history.

(56) References Cited

U.S. PATENT DOCUMENTS

| | | | |
|---|---|---|---|
| 8,880,020 B2 | 11/2014 | Moisanen et al. | |
| 10,264,622 B2* | 4/2019 | Park | H04W 76/14 |
| 10,512,036 B2* | 12/2019 | Park | H04W 48/20 |
| 10,524,189 B2* | 12/2019 | Hong | H04W 76/10 |
| 10,568,007 B2* | 2/2020 | Park | H04W 36/30 |
| 10,582,413 B2* | 3/2020 | Babaei | H04W 72/042 |
| 10,582,432 B2* | 3/2020 | Park | H04W 36/38 |
| 2009/0122727 A1 | 5/2009 | Gan et al. | |
| 2009/0135769 A1 | 5/2009 | Sambhwani et al. | |
| 2015/0319689 A1* | 11/2015 | Zhang | H04W 24/02 370/311 |
| 2016/0128020 A1 | 5/2016 | Agarwal et al. | |
| 2016/0227396 A1 | 8/2016 | Lee et al. | |
| 2017/0048773 A1* | 2/2017 | Miao | H04W 8/183 |
| 2017/0070877 A1* | 3/2017 | Shi | H04W 8/183 |
| 2017/0094628 A1* | 3/2017 | Miao | H04W 60/00 |
| 2017/0331577 A1* | 11/2017 | Parkvall | H04J 11/0079 |
| 2017/0331670 A1* | 11/2017 | Parkvall | H04J 11/0079 |
| 2018/0139778 A1* | 5/2018 | Chou | H04W 76/27 |
| 2018/0220487 A1* | 8/2018 | Wu | H04W 76/27 |
| 2018/0234890 A1* | 8/2018 | Shih | H04W 36/0005 |
| 2018/0234990 A1* | 8/2018 | Watfa | H04W 36/0011 |
| 2018/0279218 A1* | 9/2018 | Park | H04W 36/08 |
| 2018/0352491 A1* | 12/2018 | Shih | H04W 36/14 |
| 2019/0191483 A1* | 6/2019 | Ryoo | H04W 76/27 |
| 2019/0281524 A1* | 9/2019 | Rugeland | H04W 36/30 |

OTHER PUBLICATIONS

R2-1704120, 3GPP TSG-RAN WG2 #98, Ericsson, "RAN area updating due to mobility in RRC_INACTIVE", Hangzhou, P.R. of China, May 15-19, 2017.
R2-1704121, 3GPP TSG-RAN WG2 #98, Ericsson, "Period RAN area updates in RRC_INACTIVE", Hangzhou, P.R. of China, May 15-19, 2017.
R2-1704122, 3GPP TSG-RAN WG2 #98, Ericsson, "CN area updating in RRC_INACTIVE", Hangzhou, P.R. of China, May 15-19, 2017.
R2-1704149, 3GPP TSG-RAN WG2 #98, Samsung, "RRC procedures for the RAN notification area for NR", Hangzhou, P.R. of China, May 15-19, 2017.
R2-1704242, 3GPP TSG-RAN WG2 #98, CATT, "Relocation of anchor gNB", Hangzhou, P.R. of China, May 15-19, 2017.
R2-1704312, 3GPP TSG-RAN WG2 #98, MTI, "Comparison and Discussion on RAN-based Notification Area Update", Hangzhou, P.R. of China, May 15-19, 2017.
R2-1704550, 3GPP TSG-RAN WG2 #98, Panasonic, "RAN Update Procedure in RRC_INACTIVE", Hangzhou, P.R. of China, May 15-19, 2017.
R2-1704883, 3GPP TSG-RAN WG2 #98, Huawei, HiSilicon, "Scenarios and solution for state mismatch", Hangzhou, P.R. of China, May 15-19, 2017.
R2-1704890, 3GPP TSG-RAN WG2 #98, Huawei, HiSilicon, "Periodic RAN-based notification area update", Hangzhou, P.R. of China, May 15-19, 2017.
R2-1704891, 3GPP TSG-RAN WG2 #98, Huawei, HiSilicon, "Discussion on LAU and RNA Update for inactive state", Hangzhou, P.R. of China, May 15-19, 2017.
R2-1705260, 3GPP TSG-RAN WG2 #98, Fujitsu, "RAN based area update procedure", Hangzhou, P.R. of China, May 15-19, 2017.
R2-1705269, 3GPP TSG-RAN WG2 #98, NEC, "Location update at RAN-based notification area boundary", Hangzhou, P.R. of China, May 15-19, 2017.
3GPP TSG-RAN WG2 #97, Tdoc R2-1700894, Ericsson, "RAN area updating due to mobility in RRC_INACTIVE", Athens, Greece, Feb. 13-17, 2017.

* cited by examiner ously reporting its location. The coverage of the system is divided into several geographic areas, each of which consists of multiple cells. The mobile station reporting takes place when the mobile station moves across the boundary of an area. When the network receives incoming data which should be sent to the mobile station, the network broadcasts a paging message to all of the cells in the area that the mobile station is supposed to be located.

AREA UPDATE PROCEDURE(S) FOR RADIO SYSTEM

This application claims the priority and benefit of U.S. Provisional Patent Application 62/516,586, filed Jun. 7, 2017, entitled "AREA UPDATE PROCEDURE(S) FOR RADIO SYSTEM", which is incorporated herein by reference in its entirety.

TECHNICAL FIELD

The technology relates to wireless communications, and particularly to methods and apparatus for performing area update procedures in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In LTE telecommunications a mobile station (UE) may be in one of several Radio Resource Control (RRC) states, such as IDLE state or RRC-connected state, for example. In typical cellular mobile communication systems, the reachability by the network of a mobile station (UE) in the IDLE state, i.e. the ability of the network to reach the UE by paging, is achieved by the mobile station occasionally reporting its location. The coverage of the system is divided into several geographic areas, each of which consists of multiple cells. The mobile station reporting takes place when the mobile station moves across the boundary of an area. When the network receives incoming data which should be sent to the mobile station, the network broadcasts a paging message to all of the cells in the area that the mobile station is supposed to be located.

In Long-Term Evolution (LTE) and LTE Advanced (LTE-A), such a geographic area is called a "tracking area" (TA). When first registering with the core network (CN), the user equipment (UE) is given a TA or a list of TAs. Subsequently, when moving out of the coverage of the initially specified TA(s), the UE reports its presence by sending a Tracking Area Update (TAU) message to the core network via a currently camped base station, e.g., an evolved Node B (eNB). As a response, the network then provides the mobile station with an updated TA or a list of TAs.

When a mobile-terminated event (such as an incoming call) occurs, the network attempts to page the UE by broadcasting a Paging message. This Paging message is transmitted from all the eNBs in the TA or TAs in the list where the UE is supposed to be located.

In general, paging is radio resource intensive, since paging uses downlink radio resources on all the cells in the area. A smaller area size might reduce the resource usage, but conversely would increase the number of TAUs that the mobile station needs to perform.

3GPP is currently discussing introduction of an "INACTIVE" state for 5G, where the Radio Access Network (RAN) manages the mobility of the UEs in the state, in order to hide mobility and state transitions from the core network.

What is needed, therefore, and example object(s) of the technology disclosed herein, are methods, apparatus, and techniques to provide area update procedures that are suitable for a 5G system.

SUMMARY

In one of its aspects the technology disclosed herein concerns a communications system comprising a radio access node (22) and a wireless terminal (26). The wireless terminal comprises receiver circuitry (40) and transmitter circuitry (44) as well as terminal processor circuitry (40). The receiver circuitry (40) is configured to receive, from the radio access node (22), a Radio Resource Control (RRC) message comprising information configuring a Radio Access Network-based (RAN-based) notification area. The terminal processor circuitry (40) is configured to initiate, in a case where the wireless terminal is in an inactive state, a RAN-based notification area update procedure upon the wireless terminal moving out of the configured RAN-based notification area. The information configuring the RAN-based notification area comprises one or more tracking area codes, each of the one or more tracking area codes being used to identify a tracking area.

In another of its example aspects, the technology disclosed herein concerns a radio access node of a radio access network which comprises receiver circuitry and transmitter circuitry and processor circuitry. The receiver circuitry and transmitter circuitry are configured to communicate across a radio interface with a wireless terminal. The transmitter circuitry is configured to transmit, to the wireless terminal, a Radio Resource Control (RRC) message comprising information configuring a Radio Access Network-based (RAN-based) notification area. The receiver circuitry is configured to receive, from the wireless terminal, a RAN-based notification area update based on the configured RAN-based notification area, wherein the wireless terminal is in an inactive state. The processor circuitry is configured to process the received RAN-based notification area update. The information configuring the RAN-based notification area comprises one or more tracking area codes, each of the one or more tracking area codes being configured to identify a tracking area.

In yet another of its example aspects the technology disclosed herein concerns a method for a wireless terminal that communicates with a radio access node. In a basic mode the method comprises receiving, from the radio access node, a Radio Resource Control (RRC) message comprising information configuring a Radio Access Network-based (RAN-based) notification area, and, initiating, in a case where the wireless terminal is in an inactive state, a RAN-based notification area update procedure upon the wireless terminal moving out of the configured RAN-based notification area. The information configuring the RAN-based notification area comprises one or more tracking area codes, each of the one or more tracking area codes being used to identify a tracking area.

In still another of its example aspects the technology disclosed herein concerns a method for a radio access node that communicates with a wireless terminal. In a basic mode the method comprises transmitting, to the wireless terminal, a Radio Resource Control (RRC) message comprising information configuring a Radio Access Network-based (RAN-based) notification area; receiving, from the wireless terminal, a RAN-based notification area update based on the configured RAN-based notification area, wherein the wireless terminal is in an inactive state, and; processing the received RAN-based notification area update. The information configuring the RAN-based notification area comprises one or more tracking area codes, each of the one or more tracking area codes being used to identify a tracking area.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1A:
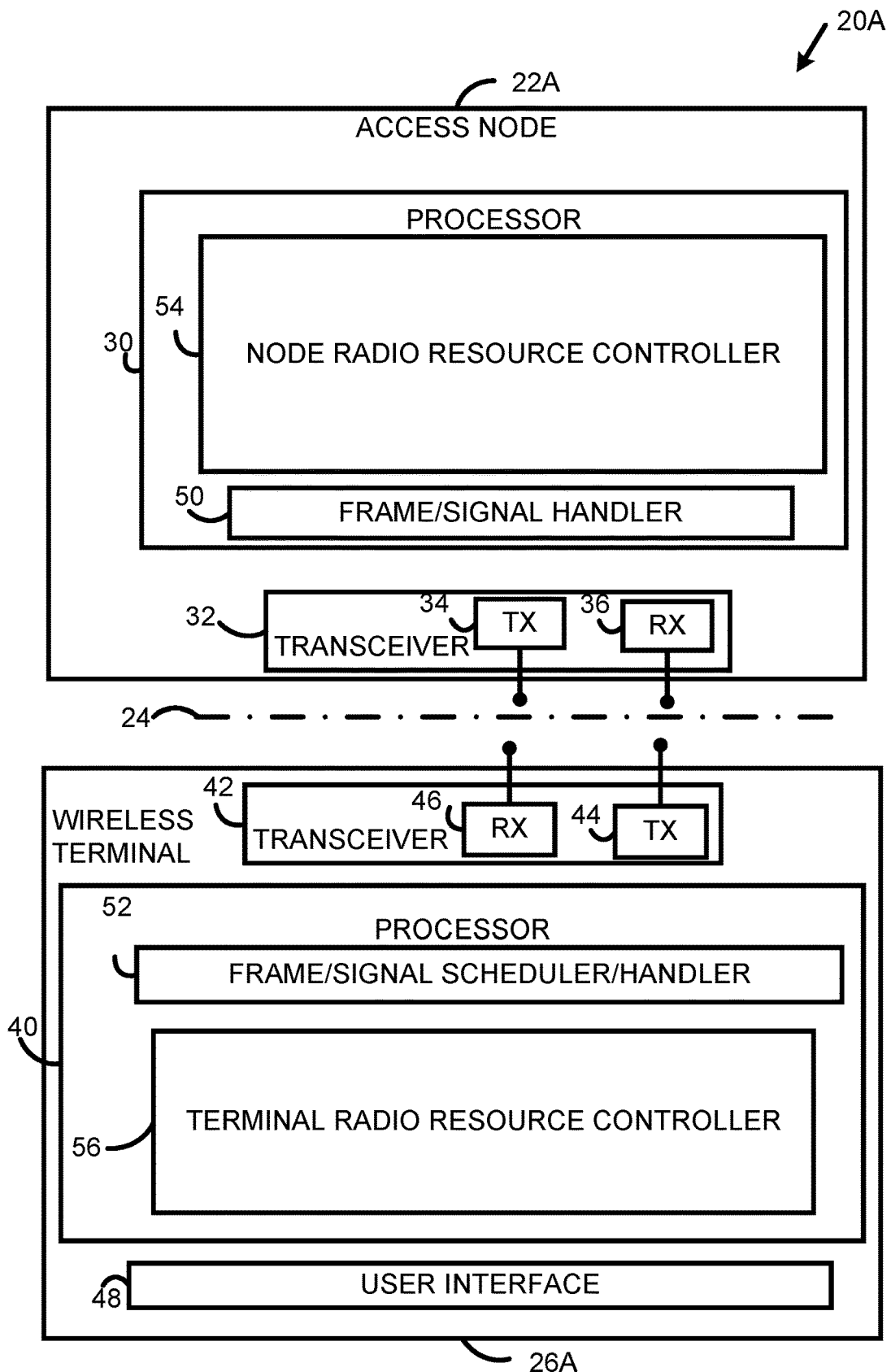
FIG. 1A-FIG. 1E are schematic views showing an example communications system comprising differing configurations of radio access nodes and a wireless terminal which perform random access procedures according to differing example embodiment and modes of the technology disclosed herein.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands may include configured cells. Configured cells can include cells of which a UE terminal is aware and in which it is allowed by a base station to transmit or receive information.

FIG. 1A-FIG. 1E shows an example communications systems 20A-20E wherein area update procedures according to example, non-limiting embodiments and modes of the technology disclosed herein are described. In each of FIG. 1A-FIG. 1E, the components and functionalities that have a same base reference numeral have same or similar structure and operation unless otherwise noted or otherwise clear from context. In the example communications systems 20A-20E respective radio access nodes 22A-22E communicate over air or radio interface 24 (e.g., Uu interface) with respective wireless terminals 26A-26E. As used herein, reference to any one of the radio access nodes 22A-22E may, for sake of convenience, be generically noted as node 22, and reference to any one of the wireless terminals 26A-26E may also be generically noted as wireless terminal 26.

As mentioned above, the radio access node 22 may be any suitable node for communicating with the wireless terminal 26, such as a base station node, or eNodeB ("eNB") or gNodeB or gNB, for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and wireless terminal 26, the respective transceiver circuitries 22 include antenna(s). The respective transmitter circuits 36 and 46 may comprise, e.g., amplifier(s), modulation circuitry and other conventional transmission equipment. The respective receiver circuits 34 and 44 may comprise, e.g., e.g., amplifiers, demodulation circuitry, and other conventional receiver equipment.

In general operation node, access node 22 and wireless terminal 26 communicate with each other across radio interface 24 using predefined configurations of information.

By way of non-limiting example, the radio access node 22 and wireless terminal 26 may communicate over radio interface 24 using "frames" of information that may be configured to include various channels. In Long Term Evolution (LTE), as a non-limiting example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

To cater to the transmission of information between radio access node 22A and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52. The terminal processor 40 further comprises synchronization information generator 54.

The technology disclosed herein particularly concerns area update procedure(s) and the base stations (e.g., radio access nodes) and wireless terminals that participate in the area update procedure(s), and methods of operation of such base stations/nodes and wireless terminals. Various area update procedures described herein are area updates that may occur during radio resource control (RRC) states, and particularly to an area update procedure that may occur in the mobile station in a RRC_INACTIVE state. To this end, radio access node 22A is shown as comprising node radio resource controller 54 and wireless terminal 26A is shown as comprising terminal radio resource controller 56. Both node random access procedure controller 54 and terminal radio resource controller 56 govern Radio Resource Control (RRC) operations, including RRC states and transitions between the RRC states. The node radio resource controller 54 and terminal radio resource controller 56 participate in the example embodiments and modes of the area update procedures described herein.

It should be understood that apparatus, functionalities, acts and the like that are commonly numbered throughout the various example embodiments and modes have essentially the same structure and/or operation for each of the example embodiments and modes unless otherwise noted.

For yet other example embodiments and modes, aspects of the various embodiments and modes may be used in combination with one another.

Figure 2:
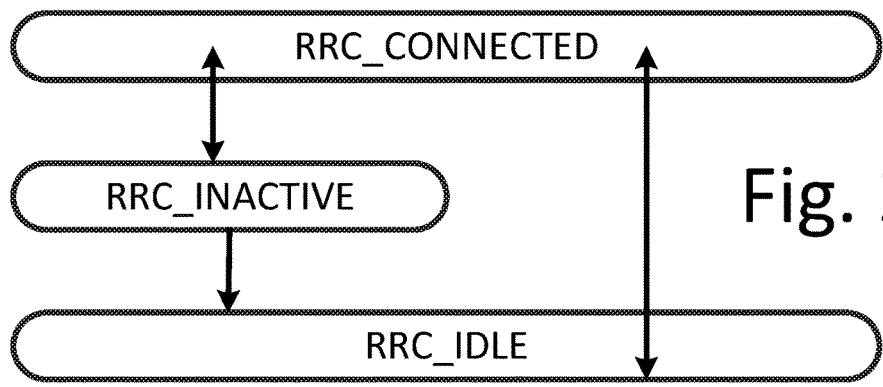
FIG. 2 is a diagrammatic view of radio resource control (RRC) states of a New Radio (NR) system.

The node radio resource controller 54 and the terminal radio resource controller 56 may participate in RRC states such as the New Radio (NR) system radio resource control (RRC) states shown in FIG. 2. Such RRC states may include the RRC_CONNECTED state, the RRC_IDLE state, and the RRC_INACTIVE state. These RRC states may be characterized, at least in part, as follows:

RRC_IDLE:
  A UE specific DRX (discontinuous reception) may be configured by upper layers;
  UE controlled mobility based on network configuration;
  The UE:
  Monitors a Paging channel;
  Performs neighboring cell measurements and cell (re-) selection;
  Acquires system information.
RRC_INACTIVE:
  A UE specific DRX may be configured by upper layers or by RRC layer;
  UE controlled mobility based on network configuration;
  The UE stores the Access Stratum (AS) context;
  The UE:
  Monitors a Paging channel;
  Performs neighboring cell measurements and cell (re-) selection;
  Performs RAN-based notification area updates when moving outside the RAN-based notification area;
  Acquires system information.
RRC_CONNECTED:
  The UE stores the AS context.
  Transfer of unicast data to/from UE.
  At lower layers, the UE may be configured with a UE specific DRX;
  Network controlled mobility, i.e. handover within NR and to/from E-UTRAN;
  The UE:
  Monitors a Paging channel;
  Monitors control channels associated with the shared data channel to determine if data is scheduled for it;
  Provides channel quality and feedback information;
  Performs neighboring cell measurements and measurement reporting;
  Acquires system information.

1.0 First Example Embodiment

Figure 3:
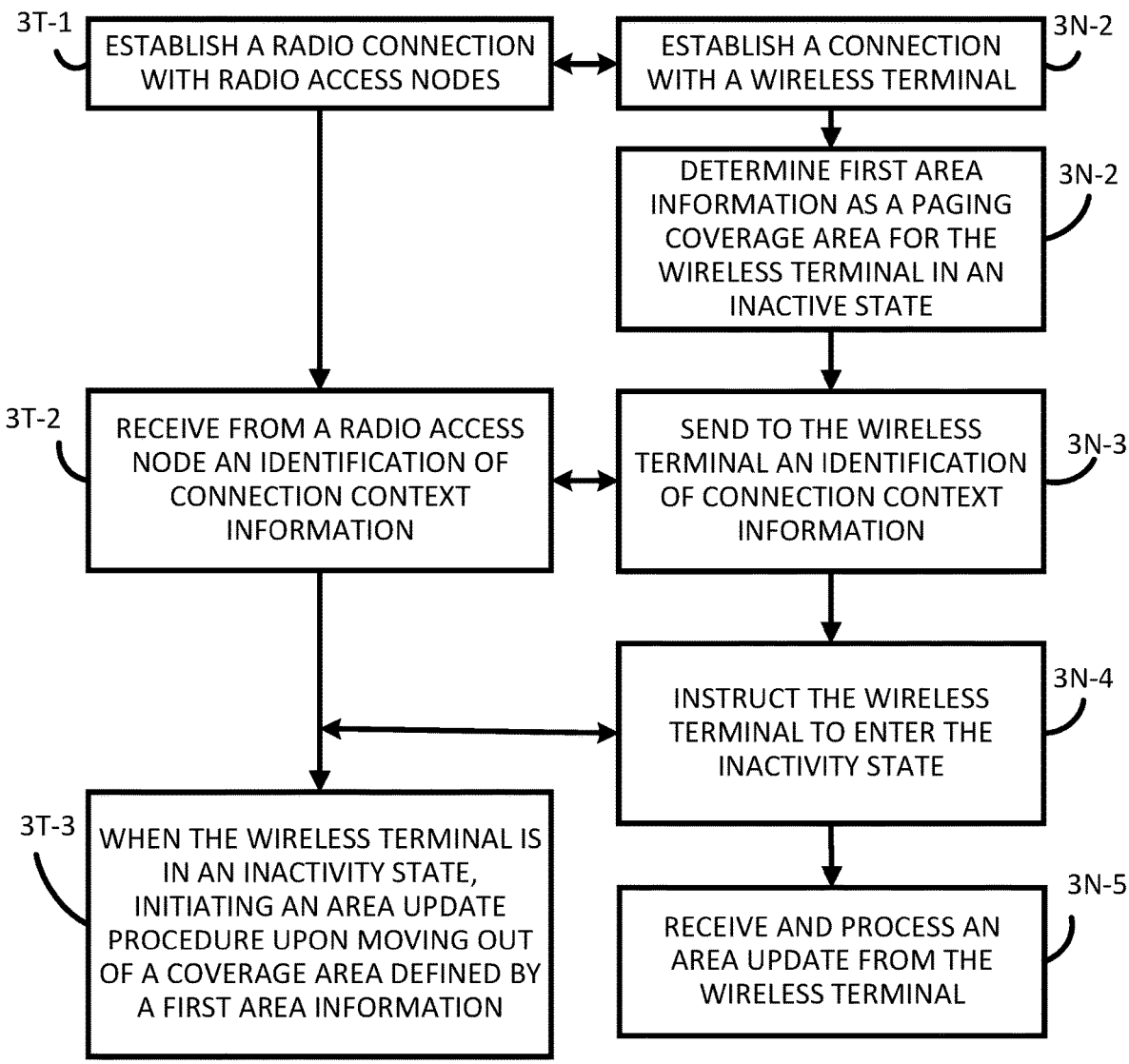
FIG. 3 is a flowchart showing example, non-limiting, representative acts or steps performed by the wireless terminals of the systems of FIG. 1A-FIG. 1E

A first and generic example embodiment and mode of the radio access node 22 and wireless terminal 26 are illustrated in FIG. 1A. Example acts or steps performed by the wireless terminal 26 and the radio access node 22A of the first example embodiment and mode are illustrated in FIG. 3. The wireless terminal acts and the access node access of FIG. 3 are further understood and described with reference to the RRC state transitions and RRC procedures of FIG. 6, FIG. 7, and FIG. 9, for example.

The acts or steps performed by wireless terminal 26A in a first and generic example embodiment and mode are shown on the left side of FIG. 3, and are labelled as acts 3T-x (where x=1, 2, 3). Act 3T-1 of FIG. 3 comprises the wireless terminal 26, and particularly the terminal processor 40, establishing a radio connection with radio access nodes, such as radio access node 22A. Act 3T-2 comprises the wireless terminal 26 receiving from a radio access node an identification of connection context information. Act 3T-3 is performed, e.g., by the terminal radio resource controller 56 when the wireless terminal is in an inactivity state, and comprises initiating an area update procedure upon moving out of a coverage area defined by a first area information.

The acts or steps performed by radio access node 22A in a first and generic example embodiment and mode are shown on the right side of FIG. 3, and are labelled as acts 3N-x (where x=1, 2, 3, 4, 5). Act 3N-1 comprises the radio access node 22A establishing a connection with a wireless terminal. Act 3N-2 comprises determining first area information as a paging coverage area for the wireless terminal in an inactive state. Act 3N-3 comprises the radio access node 22A sending to the wireless terminal an identification of connection context information. 3N-4 comprises the radio access node 22A instructing the wireless terminal to enter the inactivity state. Act 3N-5 comprises the radio access node 22A receiving and processing an area update from the wireless terminal.

Figure 4:
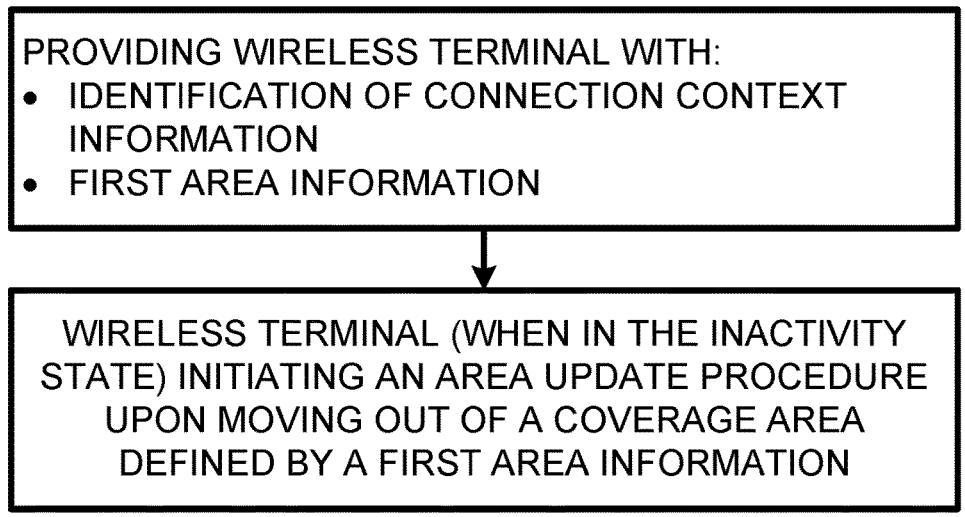
FIG. 4 is a diagrammatic view showing example features of a generic example embodiment and mode.

As shown in FIG. 4, features of the first and generic example embodiment and mode include but are not limited to:
  providing the wireless terminal 26A, when the wireless terminal 26A enters an inactivity state (e.g., the RRC_INACTIVE state), with
    (1a) an identification of connection context information (see act 3T-2 and act 3N-3) and
    (1b) "first area information" (see act 3T-3), and
  (2) the wireless terminal 26A (when in the inactivity state) initiating an area update procedure upon moving out of a coverage area defined by a first area information (see act 3T-3 and act 3N-5).

As used herein, the "connection context information" may include AS context, e.g., a set of parameters that the wireless terminal 26A and the Radio Access Network (RAN) established during the RRC_CONNECTED state. The connection context information may include parameters such as security keys for encryptions and data integrity. The connection context information, e.g., the AS context, is stored by the wireless terminal 26A when entering the RRC_INACTIVE state (always from the RRC_CONNECTED state), and also preserved and shared within the RAN.

The "first area information" mentioned in conjunction with act 3T-3 and 3N-2 is also referred to herein as information describing a RAN-based notification area. In the RRC_INACTIVE state, the mobility of the wireless terminal 26A is managed by such RAN-based notification area. The information describing the RAN-based notification area, e.g., the first area information", essentially defines a coverage area which, when left or exited by the wireless terminal 26A in the RRC_INACTIVE state, requires performance of at least some type of update procedure relative to the radio access network. The definition of such coverage area, i.e., the first area information or information describing the RAN-based notification area, is preferably maintained (e.g., stored) in a RAN node or server, such as an access node or a server of a management entity, such as a Mobility Management Entity [MME], for example. In differing example embodiment and modes, the first area information may be expressed in differing ways. The generic example embodiment and mode of FIG. 1A encompasses and may employ any suitable manner of expression of the first area information.

Figure 5:
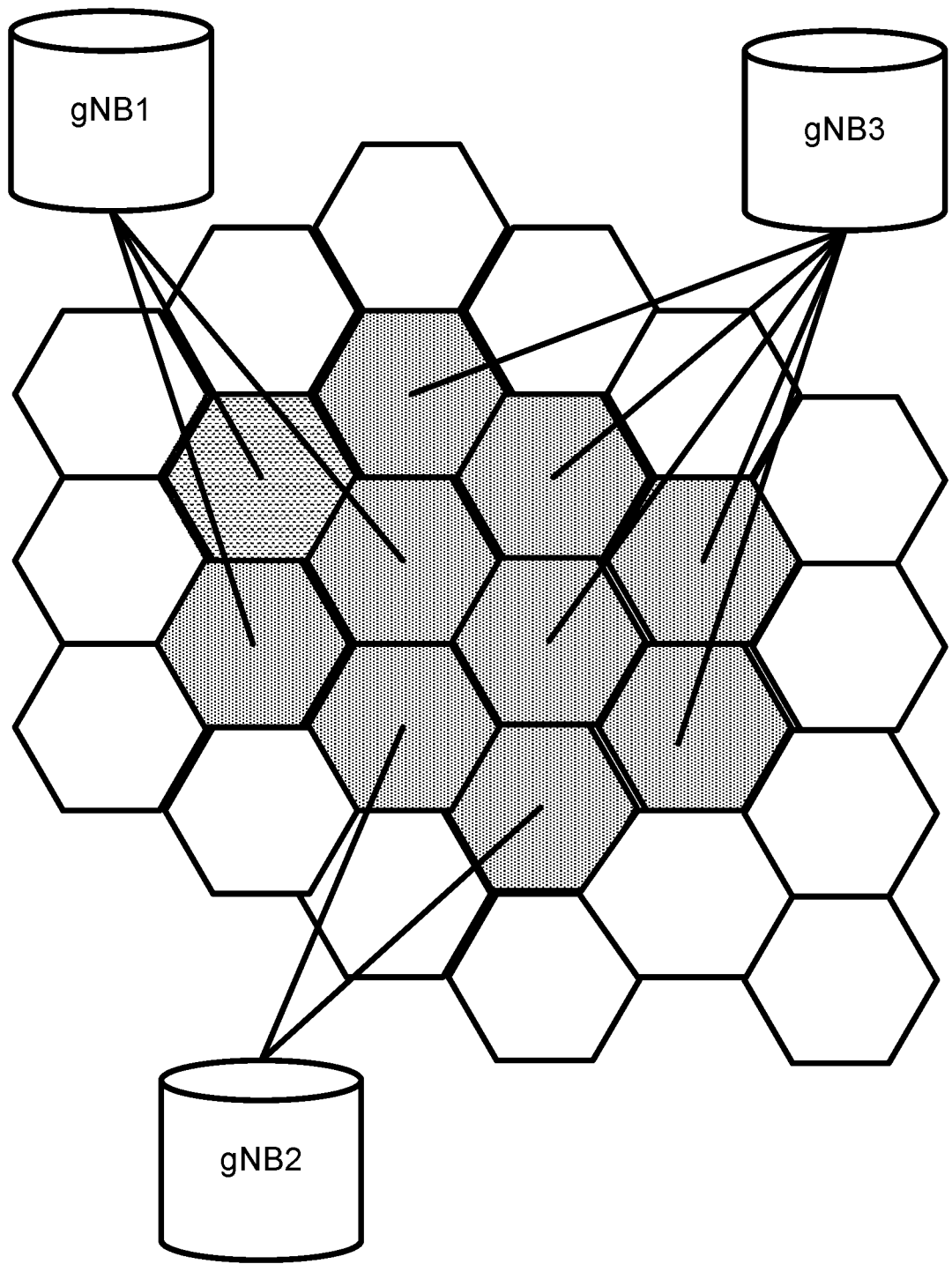
FIG. 5 is a diagrammatic view depicting an exemplary deployment of the RAN-based notification area comprising multiple cells.

FIG. 5 depicts an example expression of the first area information in an exemplary deployment of the RAN-based notification area. In the example expression of FIG. 5, the RAN-based notification area comprises multiple cells controlled by gNBs (gNB1, gNB2 and gNB3). The cells of the RAN-based notification area of FIG. 5 are shown as stippled hexagons, with three cells of the RAN-based notification area being controlled by radio access node gNB1, two cells being controlled by access node gnB2, and five cells being controlled by access node gNB3. The example expression of the information describing the RAN-based notification area of FIG. 5 may be a listing of cell identities, e.g., a listing of cell identifies comprising the RAN-based notification area. In one configuration, when incoming downlink data is received by the radio access network for transmission to wireless terminal 26A, the RAN may send a paging message to the RAN-based notification area.

Figure 6:
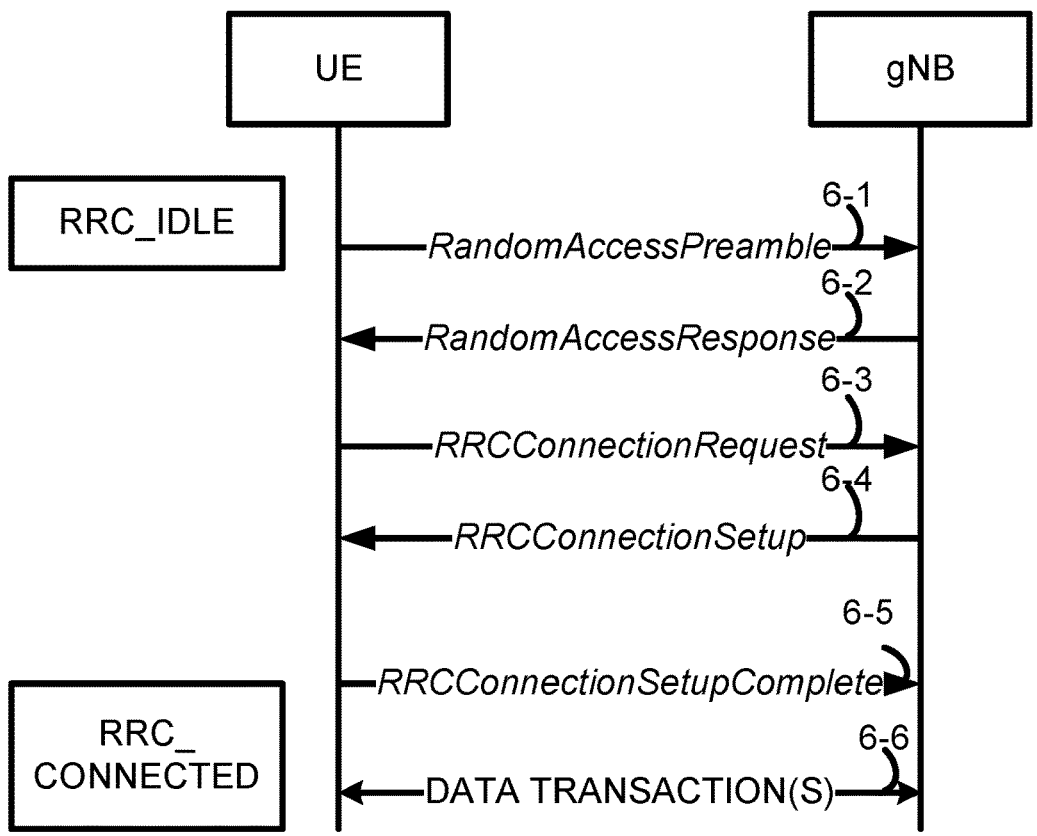
FIG. 6 is signaling diagram showing an example procedure of a state transition from the RRC_IDLE state to the RRC_CONNECTED state.

FIG. 6 shows an example procedure of a state transition from RRC_IDLE state to RRC_CONNECTED state. The state transition from RRC_IDLE state to RRC_CONNECTED state may be triggered by a suitable event, such as uplink user/signaling data transfer, receipt of a paging from the network, etc. As shown in FIG. 6, the wireless terminal 26A initiates the connection establishment procedure. The connection establishment procedure comprises the wireless terminal 26A sending a message 6-1 with a Random Access Preamble to the radio access node 22; the radio access node 22 sending a Random Access Response message 6-2; the wireless terminal 26A sending a RRCConnectionRequest message 6-3; the access node 22 sending a RRCConnectionSetup message 6-4; and the wireless terminal 26A sending a RRCConnectionSetupComplete message 6-5. After the connection establishment procedure, the wireless terminal 26A enters the RRC_CONNECTED state. The wireless terminal 26A and the radio access node 22A may then perform data transaction(s) 6-6.

Figure 7:
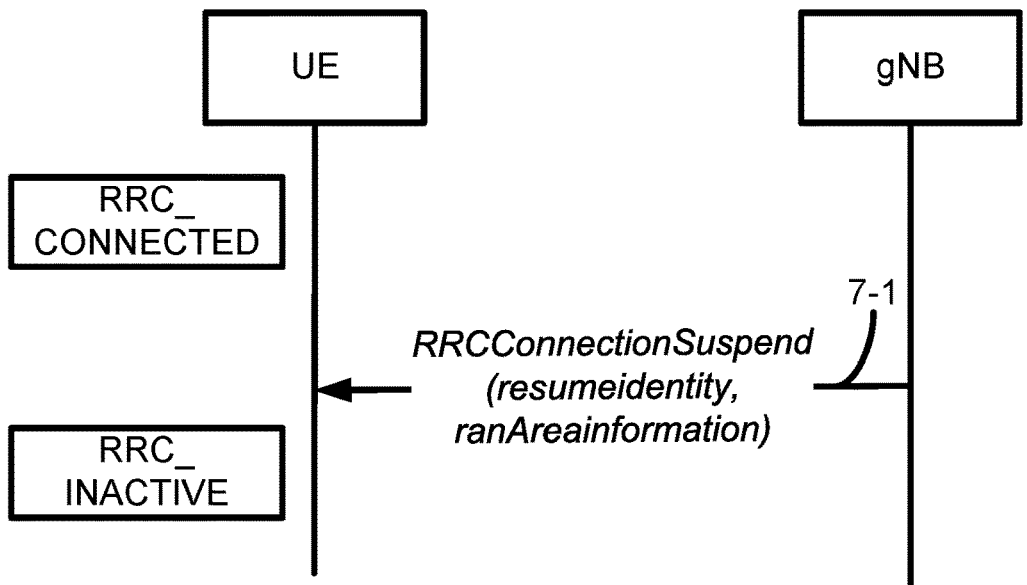
FIG. 7 is signaling diagram showing an example procedure of a state transition from the RRC_CONNECTED state to the RRC_INACTIVE state.

FIG. 7 shows an example procedure of a state transition from the RRC_CONNECTED state to the RRC_INACTIVE state. During the RRC_CONNECTED state, the current access node (the gNB that currently maintains connection with the wireless terminal 26A) may decide to place the wireless terminal in the RRC_INACTIVE state by sending a RRCConnectionSuspend message 7-1 to the wireless terminal 26A. This may happen, for example, when the access node detects data inactivity for a pre-determined duration. The access node may be the same as the gNBs in FIG. 6 if the wireless terminal 26A is stationary, or may be different if the wireless terminal 26A has performed a handover after the connection establishment.

The RRCConnectionSuspend message (see message 7-1 of FIG. 7) may include information elements such as resumeIdentity and ranAreaInformation. The resumeIdentity information element identifies the UE-specific AS context saved in the RAN; the ranAreaInformation information element comprises information or parameters indicating the RAN-based notification area, e.g., the first area information. For example, the ranAreaInformation information element may comprise a list of cell identities. In one example implementation, the RRCConnectionSuspend message may be formatted as follows:

```
-- ASN1START
RRCConnectionSuspend ::=      SEQUENCE {
    criticalExtensions            CHOICE {
        c1                            CHOICE {
            rrcConnectionRelease        RRCConnectionSuspend-IEs,
            spare3 NULL, spare2 NULL, spare1 NULL
        },
        criticalExtensionsFuture      SEQUENCE { }
    }
}
RRCConnectionSuspend-IEs ::=  SEQUENCE {
    resumeIdentity                ResumeIdentity
    ranAreaInformation            RANAreaInformation
    nonCriticalExtension          RRCConnectionSuspend-vxyz-IEs
    OPTIONAL
}
ResumeIdentity ::=            BIT STRING (SIZE(40))
RANAreaInformation ::=            CellIdentityList
CellIdentityList::=           SEQUENCE (SIZE (1..128)) OF
CellIdentity
CellIdentity ::=              BIT STRING (SIZE (28))
-- ASN1STOP
```

Figure 8:
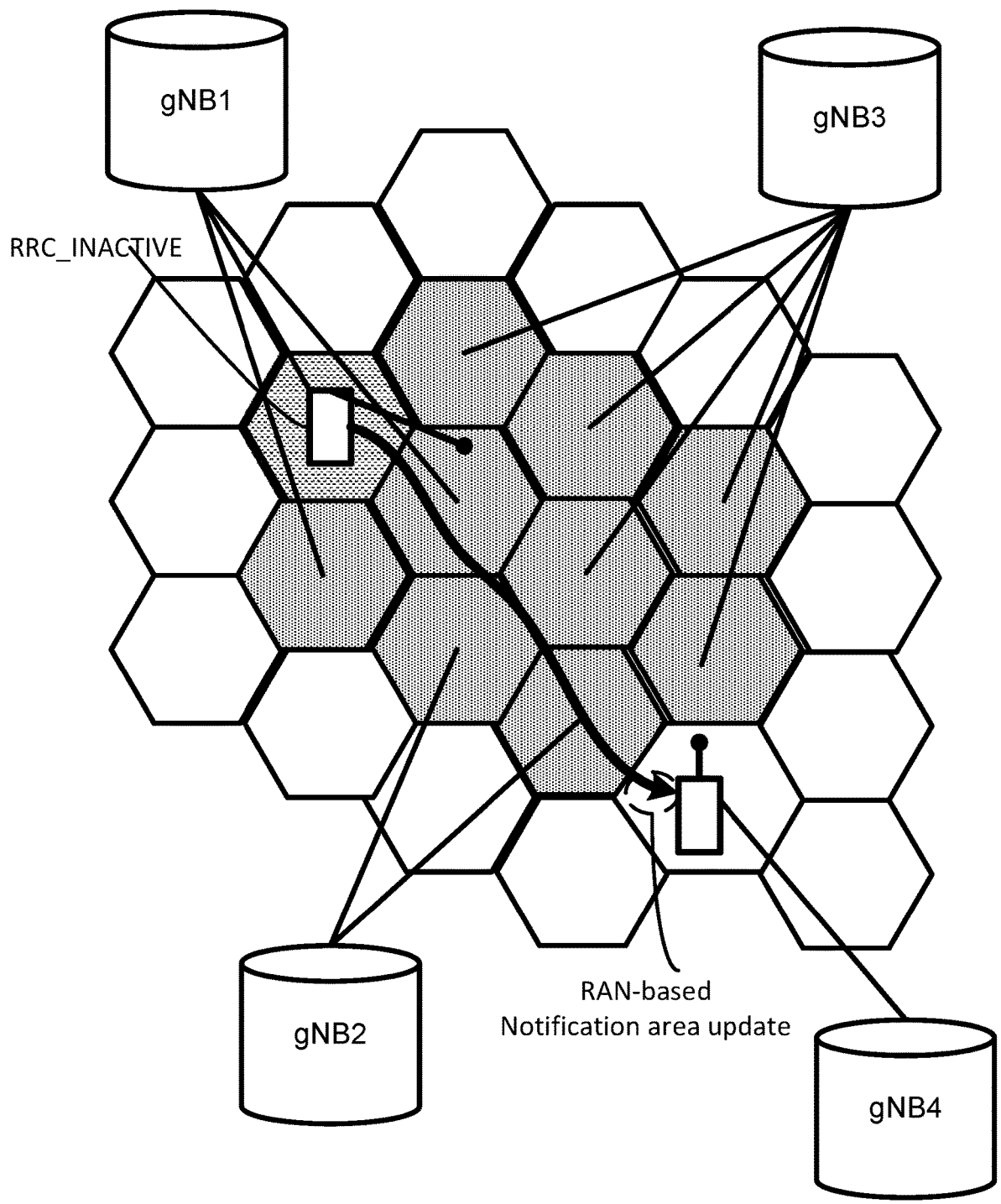
FIG. 8 is a diagrammatic view depicting a wireless terminal moving out of an area defined by ranAreaInformation and then performing a RAN-based notification area update (RAU).

After entering the RRC_INACTIVE state, the wireless terminal 26A may roam in the RAN-based notification area and perform cell reselections, as far as the cells that wireless terminal 26A camps on are listed in ranAreaInformation. As shown in FIG. 8, when the wireless terminal 26A moves out of the area defined by ranAreaInformation, the wireless terminal 26A then may perform a RAN-based notification area update (RAU).

Figure 9:
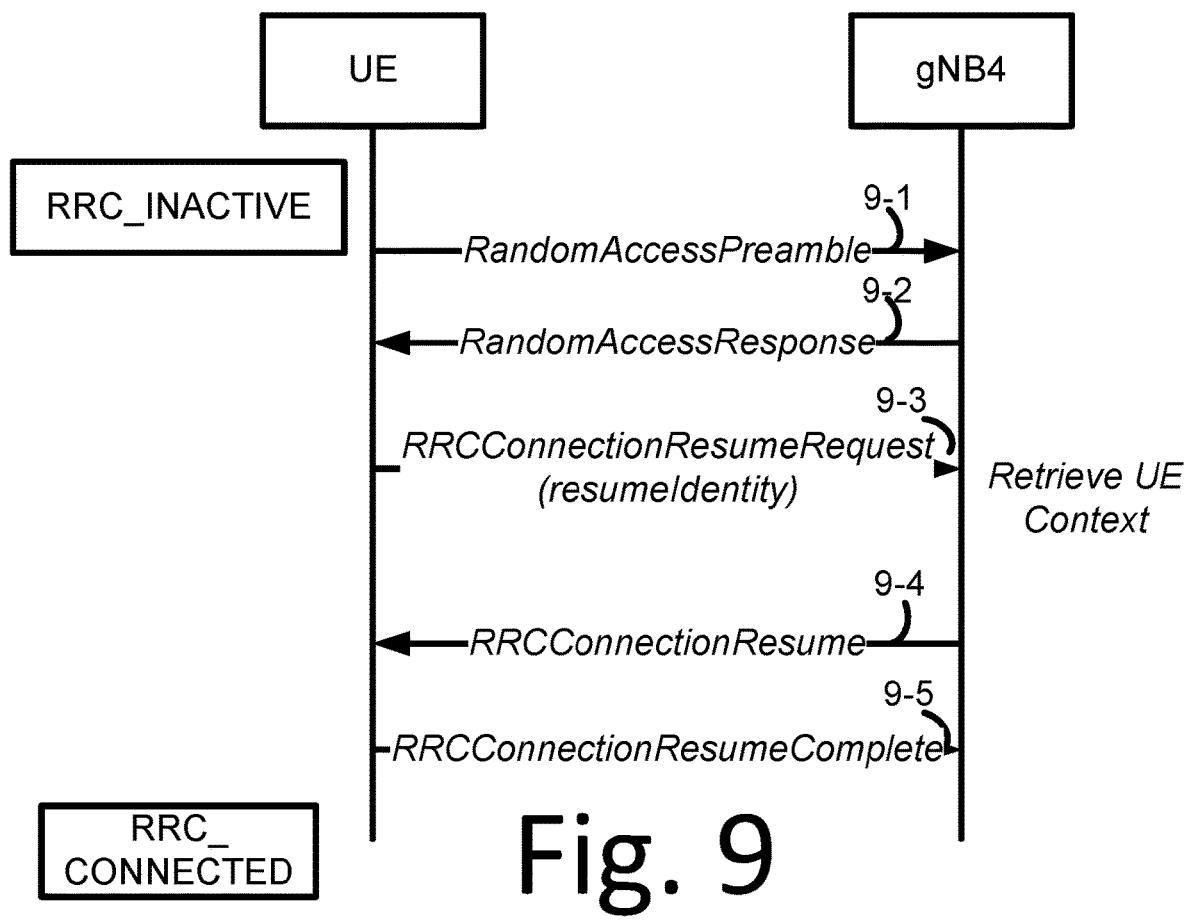
FIG. 9 is signaling diagram showing an example RAN-based notification area update (RAU) procedure

FIG. 9 shows an example RAN-based notification area update (RAU) procedure. The RAN-based notification area update (RAU) procedure includes the wireless terminal 26A sending a message 9-1 with a Random Access Preamble to the radio access node 22; the radio access node 22 sending a Random Access Response message 9-2; the wireless terminal 26A sending a RRCConnectionResumeRequest message 9-3; the access node 22 sending a RRCConnectionResume message 9-4; and the wireless terminal 26A sending a RRCConnectionResumeComplete message 9-5.

As shown in FIG. 9, after Random Access Preamble/Response, the wireless terminal 26A sends the RRCConnectionResumeRequest message 9-3 to the camping cell controlled by the gNB4 (see FIG. 8), which includes the resumeIdentity obtained upon entering the RRC_INACTIVE state. The gNB4 may then attempt to retrieve the UE-specific UE context saved in the RAN. In one configuration, resumeIdentity may indicate the location in the RAN where the UE context is saved. In another configuration, the UE context is saved in a predetermined location. When the retrieval of the UE context is successful, the gNB4 may respond back to the wireless terminal 26A with RRCConnectionResume message 9-4, followed by the wireless terminal 26A sending back RRCConnectionResumeComplete message 9-5. The wireless terminal 26A may stay in the RRC_CONNECTED state or eventually transition to the RRC_INACTIVE state as shown in FIG. 7 if the current gNB chooses to do so.

2.0 Second Example Embodiment

As mentioned above, in the generic example embodiment and mode of FIG. 1A the expression of the first area information may be of any suitable manner. In a second example embodiment and mode, the RAN-based notification area may be defined as a sub-area or a list of sub-areas of an area that has significance or definition apart from the RRC_INACTIVE state. As such, for the second example embodiment and mode the first area information is said to comprise "sub-area information" or "sub-area identification", which also may be known as "second area identification" or "second area information". The "sub-area information" or "sub-area identification" of the second embodiment and mode embodiment and mode which comprises the first area information is periodically broadcast by each cell in a system information message.

For example, in one example implementation, the sub-area identification that each cell broadcasts may be an independently defined field solely purposed for defining RAN areas. Alternatively, the sub-area identification may be shared with another identifier that specifies a certain geographic area. As an example of the latter alternative, a Tracking Area Code (TAC) that is used to identify a tracking area (TA), used for the wireless terminal 26A to perform a tracking area update (TAU) for a core network, can be also used for defining a RAN area.

Figure 1B:
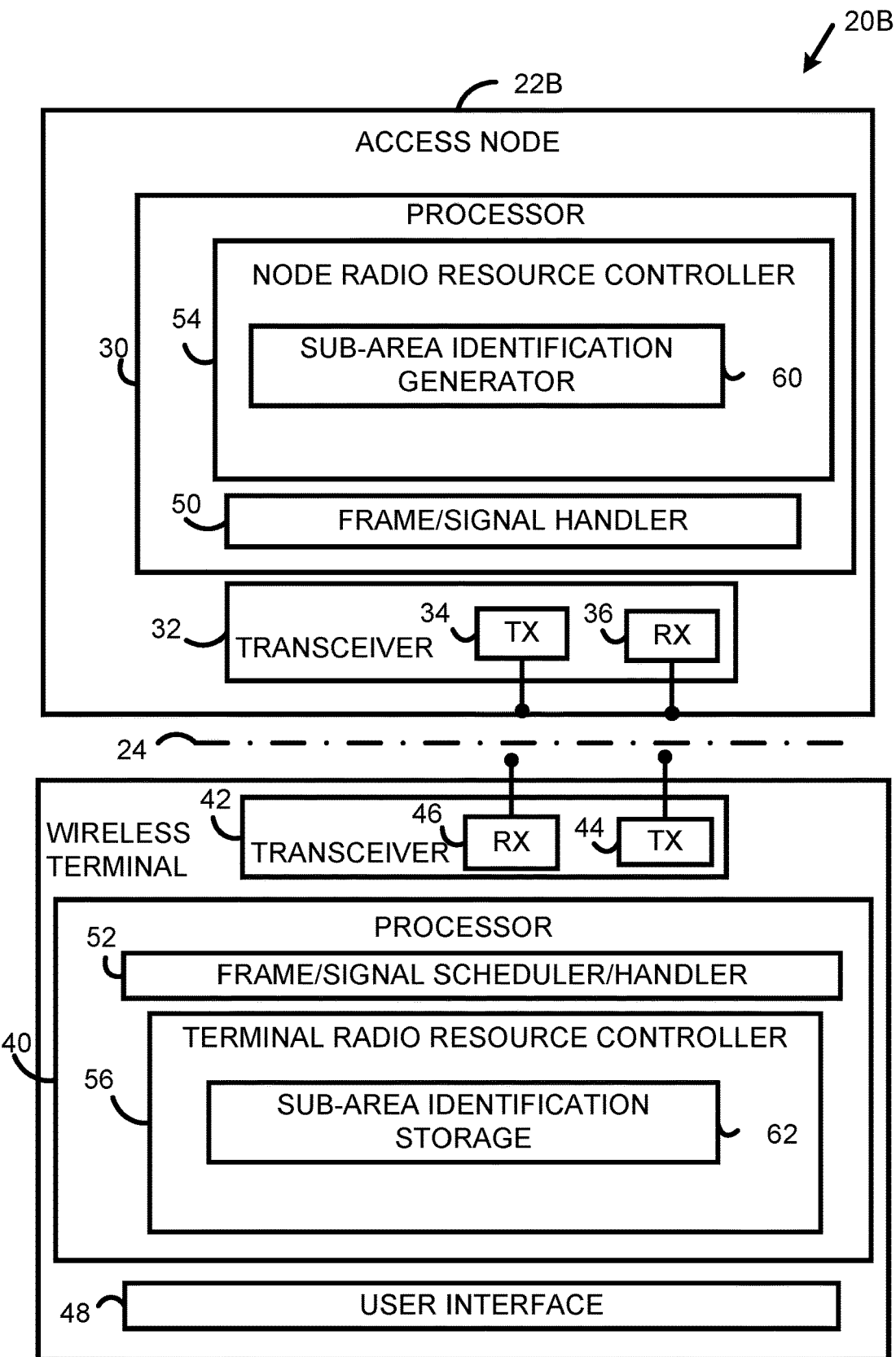

FIG. 1B shows an example implementation of a radio access node 22B and a wireless terminal 26B for the second example embodiment and mode. The radio access node 22B of FIG. 1B resembles the radio access node 22A of FIG. 1A, but further comprises or has access to sub-area identification generator 60. The wireless terminal 26B of FIG. 1B resembles the wireless terminal 26A of FIG. 1A, but further comprises sub-area identification storage 62, which may take the form of an electronic memory, e.g., in accordance with any of the memory types herein described. It should be understood that the radio access node 22B and wireless terminal 26B of FIG. 1B preform the generic acts of FIG. 3 and include the generic features of FIG. 4, but differ in the definition of the first area information as comprising second area information which is expressed in terms of a sub-area or list of sub-areas.

As mentioned above, in the example embodiment and mode of FIG. 1A an identification of the sub-area is periodically broadcasted by each cell via a system information message. As such, the RRCConnectionSuspend message may include a list of such sub-area identifications as (e.g., in the information element) ranAreaInformation. Moreover, upon each cell reselection, the wireless terminal 26B in the RRC_INACTIVE state that has received RRCConnectionSuspend may obtain the broadcasted sub-area identification when camping on a new cell and perform RAU as disclosed in the first embodiment if the received sub-area identification is not included in the ranAreaInformation.

Figure 10:
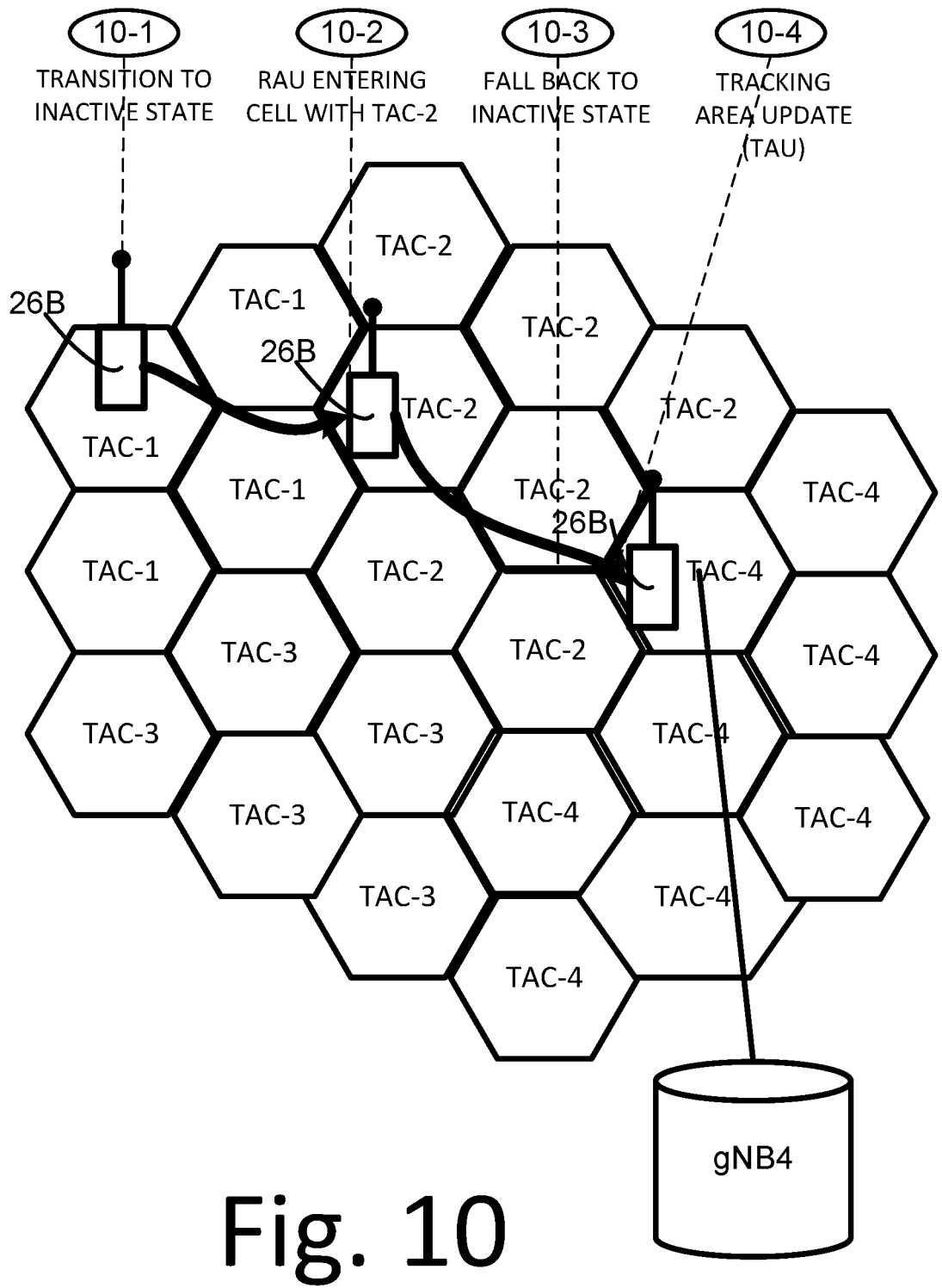
FIG. 10 is a diagrammatic view depicting an example scenario of a second example embodiment and mode in which tracking area code (TAC) is used as an identification of a RAN area.

FIG. 10 illustrates one example scenario of the second example embodiment and mode in which tracking area code (TAC) is used as an identification of a RAN area. Initially in the FIG. 10 situation the wireless terminal 26B has been provided with a list of TACs (TAC_1, TAC_2 and TAC_3) when the wireless terminal 26B first attached to the core network. The wireless terminal 26B then transitions to the RRC_INACTIVE state by receiving the RRCConnectionSuspend message (shown as time 10-1 in FIG. 10), and in this example receives an RRCConnectionSuspend message that specifies TAC_1 as the RAN-based notification area. Receipt of the RRCConnectionSuspend message with the new definition of the RAN-based notification area, now defined as being only TAC_1, causes wireless terminal 26B to perform a RAN-based notification area update when the wireless terminal 26B later enters a cell with TAC=TAC_2, as shown at time 10-2 in FIG. 10. At this time 10-2 the wireless terminal 26B may not perform the tracking area update since TAC_2 is included in the current TAC list, which remains available to the wireless terminal 26B. But subsequently, after the RAN-based notification area update, at a time such as time 10-3 in FIG. 10, the wireless terminal 26B may eventually fall back to the RRC_INACTIVE state by a procedure such as that shown in FIG. 7. Then, at time 10-4, the wireless terminal 26B enters a cell that belongs to TAC_4 and at time 10-4 may perform a tracking area update (TAU), instead of a RAN-based notification area update (RAU), since TAC_4 is not in the TAC list.

Figure 11:
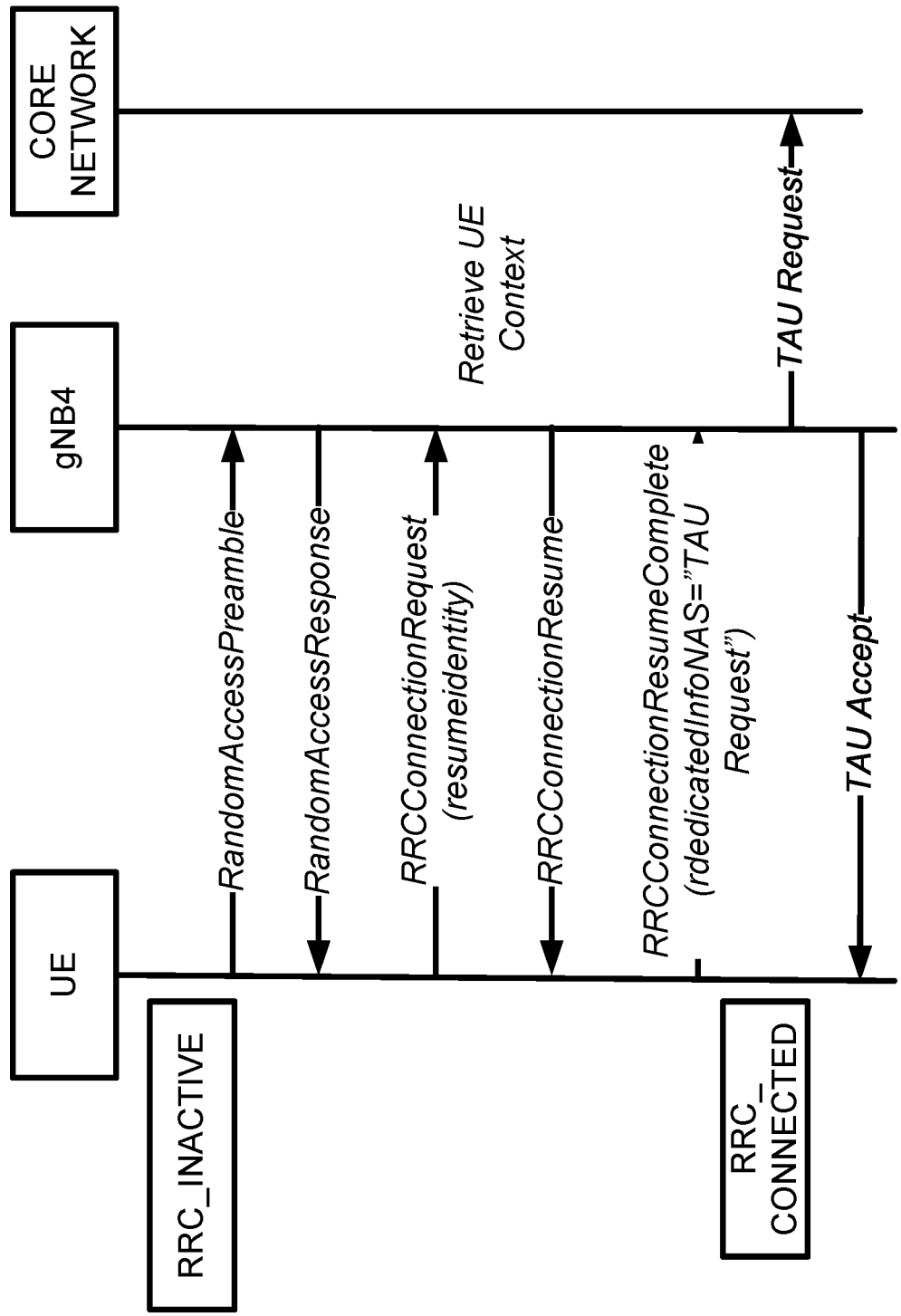
FIG. 11 is a diagrammatic view showing example acts and messages comprising an example tracking area update (TAU) procedure.

FIG. 11 shows example acts and messages comprising an example tracking area update (TAU) procedure. In the TAU of FIG. 11, wireless terminal 26B follows the resume process as essentially shown in FIG. 9, but in FIG. 11 the RRCConnectionResumeComplete message now contains "TAU Request". The RRCConnectionResumeComplete message comprising the "TAU Request" is conveyed to and processed in the core network, resulting in the core network sending back the TAU Accept message to the wireless terminal 26B. Similarly, the wireless terminal 26B may stay in RRC_CONNECTED or eventually go back to RRC_INACTIVE if directed. When going back to RRC_INACTIVE, a new RAN-based notification area (TAC_4) is provided via RRCConnectionSuspend.

The following is one exemplary implementation of the format for RRCConnectionSuspend, with a list of TACs defining the RAN-based notification area.

```
-- ASN1START
RRCConnectionSuspend ::=        SEQUENCE {
    criticalExtensions          CHOICE {
        c1                                  CHOICE {
            rrcConnectionRelease        RRCConnectionSuspend-IEs,
            spare3 NULL, spare2 NULL, spare1 NULL
        },
        criticalExtensionsFuture            SEQUENCE { }
    }
}
RRCConnectionSuspend-IEs ::=        SEQUENCE {
    resumeIdentity              ResumeIdentity
    ranAreaInformation          RANAreaInformation
    nonCriticalExtension RRCConnectionSuspend-vxyz-IEs OPTIONAL
}
ResumeIdentity ::=              BIT STRING (SIZE(40))
RANAreaInformation ::=          TrackingAreaCodeList
TrackingAreaCodeList::=SEQUENCE(SIZE(1..8))OF TrackingAreaCode
TrackingAreaCode ::=            BIT STRING (SIZE (16))
-- ASN1STOP
```

3.0 Third Example Embodiment

As mentioned above, in the generic example embodiment and mode of FIG. 1A the expression of the first area information may be of any suitable manner. In the second example embodiment and mode of FIG. 1B, the RAN-based notification area may be defined as a sub-area or a list of sub-areas of an area that has significance or definition apart from the RRC_INACTIVE state. In a third example embodiment and mode illustrated in FIG. 1C, the RAN-based notification area may be specified as a combination of cell identities and sub-area identities. In other words, the third example embodiment and mode uses an expression of the RAN-based notification area which is a combination of the second embodiment expression (sub-area information) and other expressions, such as an expression of a list of cell identifies. Thus, in the second example embodiment and mode the RRCConnectionSuspend may include these combined identifications. Similar to the second embodiment, one implementation of the sub-area identity may be (for example) TAC to identify TA. In such case, the following is an example format of the message.

```
-- ASN1START
RRCConnectionSuspend ::=        SEQUENCE {
    criticalExtensions          CHOICE {
        c1                              CHOICE {
            rrcConnectionRelease    RRCConnectionSuspend-IEs,
            spare3 NULL, spare2 NULL, spare1 NULL
        },
        criticalExtensionsFuture            SEQUENCE { }
    }
}
RRCConnectionSuspend-IEs::=     SEQUENCE {
    resumeIdentity              ResumeIdentity
    ranAreaInformation          RANAreaInformation
    nonCriticalExtension        RRCConnectionSuspend-vxyz-IEs OPTIONAL
}
ResumeIdentity ::=          BIT STRING (SIZE(40))
RANAreaInformation ::= SEQUENCE {
    cellIdentityList            CellIdentityList
    trackingAreaCodeList            TrackingAreaCodeList
    nonCriticalExtension        RANAreaInformation-vxyz  OPTIONAL
}
```

```
TrackingAreaCodeList
CellIdentityList::=       SEQUENCE(SIZE(1..128)) OF CellIdentity
CellIdentity ::=          BIT STRING (SIZE (28))
TrackingAreaCodeList::= SEQUENCE(SIZE(1..8))OF TrackingAreaCode
TrackingAreaCode ::=                BIT STRING (SIZE (16))
-- ASN1STOP
```

Figure 1C:
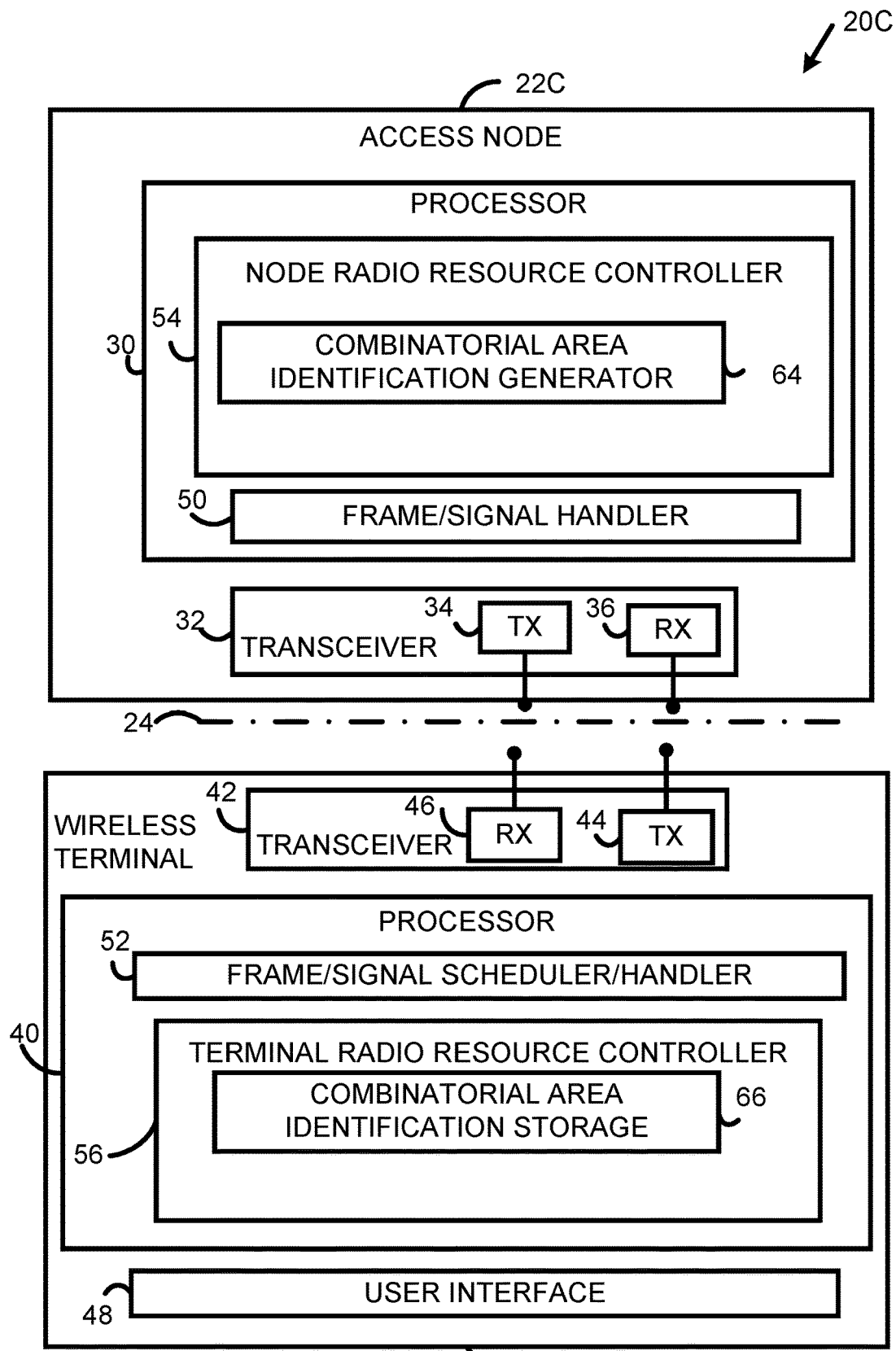

FIG. 1C shows an example implementation of a radio access node 22C and a wireless terminal 26C for the third example embodiment and mode. The radio access node 22C of FIG. 1C resembles the radio access node 22A of FIG. 1A, but further comprises or has access to combinatorial area identification generator 64. The wireless terminal 26C of FIG. 1C resembles the wireless terminal 26A of FIG. 1A, but further comprises combinatorial area identification storage 66, which may take the form of an electronic memory (in accordance with any of the memory types herein described). It should be understood that the radio access node 22C and wireless terminal 26C of FIG. 1C preform the generic acts of FIG. 3 and include the generic features of FIG. 4, but differ in the definition of the first area information as comprising second area information which is expressed in terms of combinatorial expression of areas.

Figure 12:
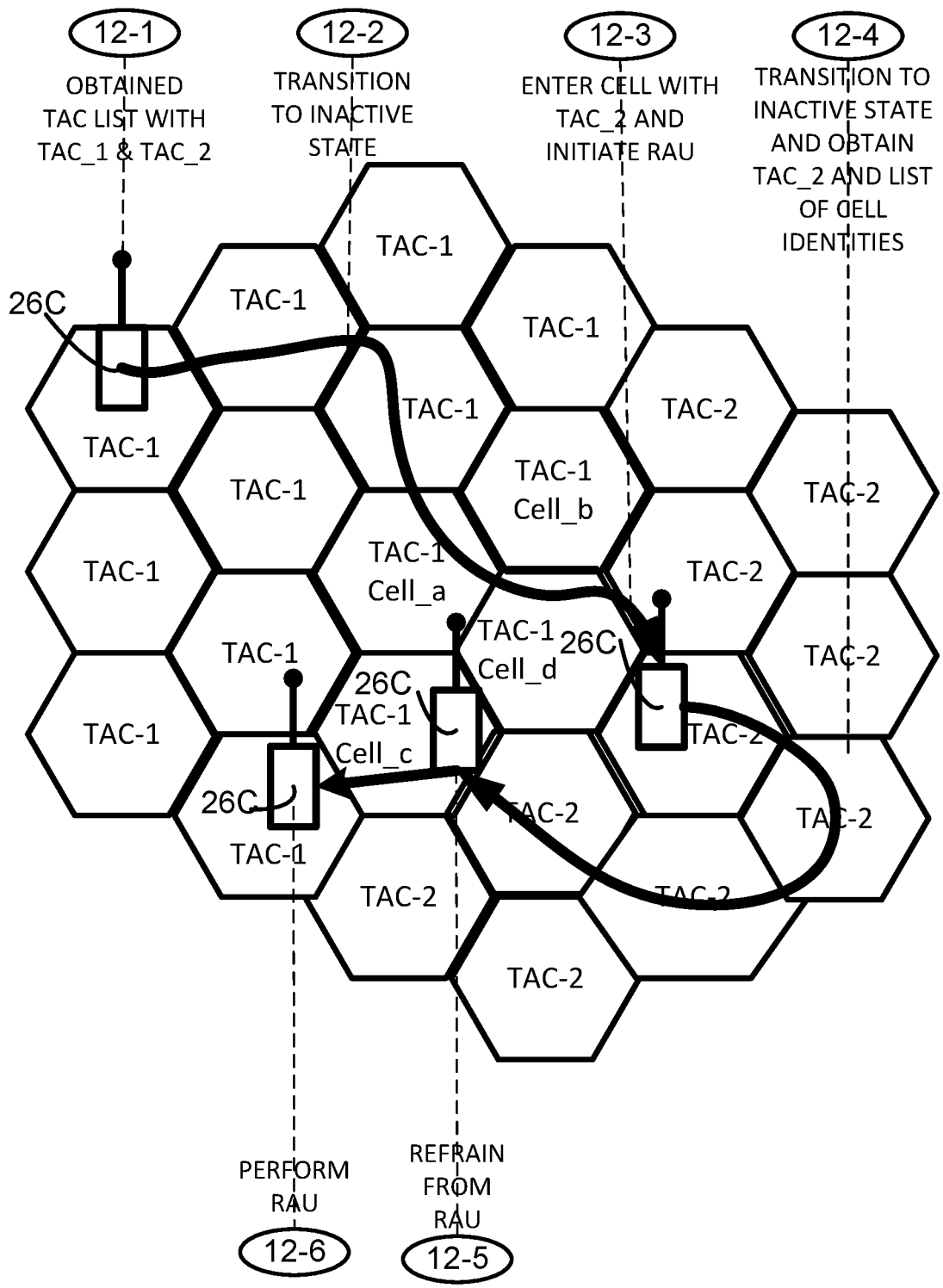
FIG. 12 is a diagrammatic views depicting an example scenario of a third example embodiment and mode.

FIG. 12 depicts a scenario of the third example embodiment and mode. In FIG. 12, at time 12-1 it is assumed that wireless terminal 26C has performed a tracking area update and obtained from the core network a tracking area code list including TAC_1 and TAC_2. Thereafter at time 12-2 the wireless terminal 26C transitions to the RRC_INACTIVE state in the tracking area with TAC=TAC_1. At this time 12-2, the UE receives RRCConnectionSuspend with ranAreaInformation including TAC_1. The UE then at time 12-3 moves out of cells under TAC_1 and enters a cell with TAC_2. The wireless terminal 26C at time 12-3 initiates RAU (understood with reference to the second embodiment). Eventually, at time 12-4 the wireless terminal 26C receives another RRCConnectionSuspend, which now includes ranAreaInformation containing not only TAC_2 but also a list of cell identities, i.e. Cell_a, Cell_b, Cell_c and Cell_d, which may not belong to TAC_2 (which, in fact, belong to TAC_1 in the example shown in FIG. 12). The wireless terminal 26c roams around within the area of TAC_2 then at time 12-5 enters Cell_c under TAC_1. Since the cell Cell_c under TAC_1 is in the cell identity list obtained via the latest RRCConnectionSuspend, the wireless terminal 26C considers itself still in the current RAN-based notification area and therefore may refrain from performing a RAN-based notification area update (RAU). Later, however, such as at time 12-6, when moving out of the combined area of TAC_2 and the four cells under TAC_1, the UE may finally perform a RAN-based notification area update (RAU), which may resulting in receiving RRCConnectionSuspend with different identity lists in ranAreaInformation (TAC_1 in the example shown in FIG. 12).

4.0 Fourth Example Embodiment

Figure 1D:
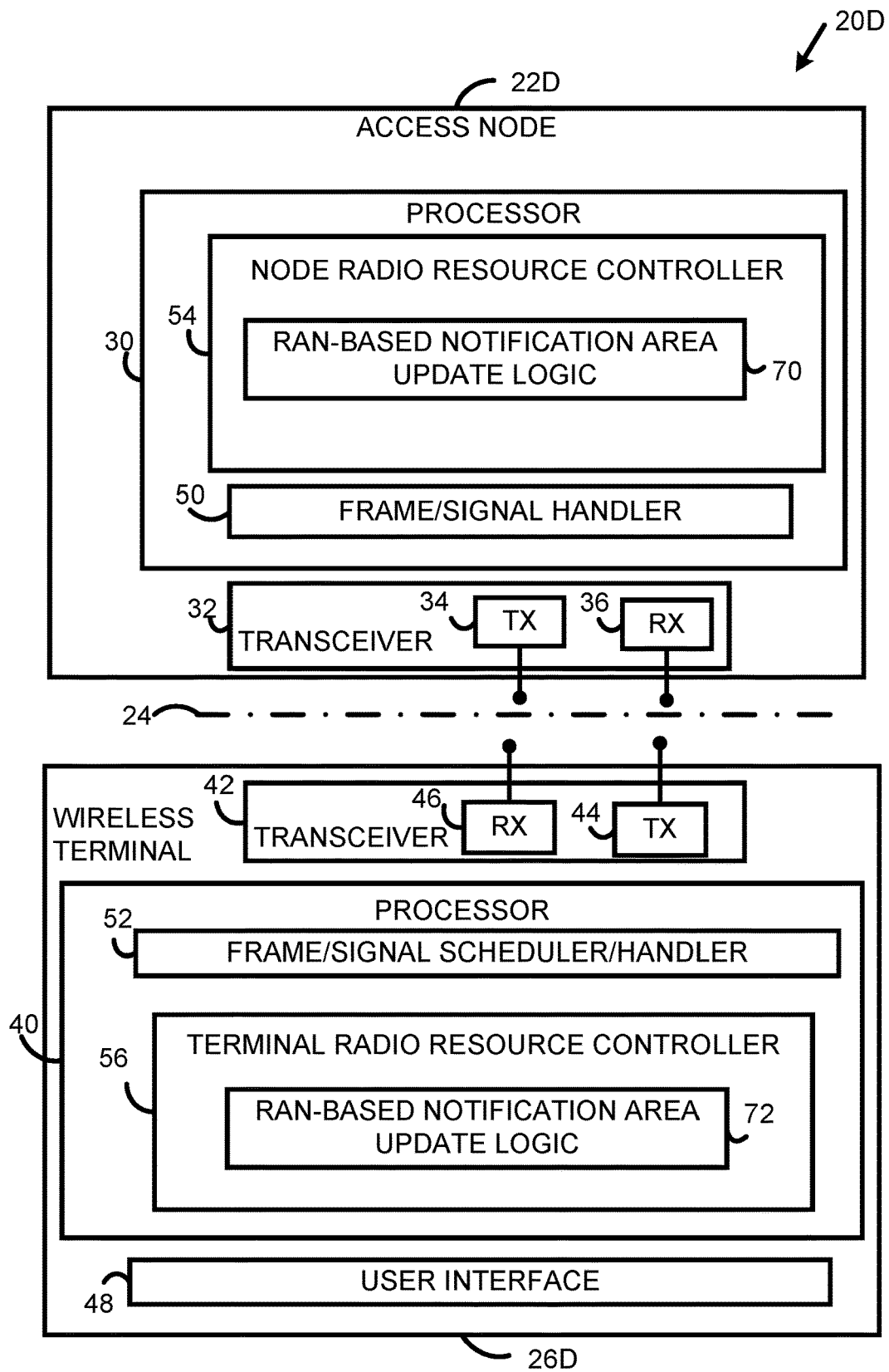

Both the fourth example embodiment and mode and the fifth example embodiment and mode are based on the second or third example embodiment and modes, with an addition of automatic RAN-based notification area update at a boundary of a pre-defined area. In the fourth example embodiment and mode there is no explicit signal to a wireless terminal to direct the wireless terminal to perform the RAN-based notification area update at a boundary of a pre-defined area, while in the fifth example embodiment and mode there is an explicit signal to direct the wireless terminal to perform the RAN-based notification area update at a boundary of a pre-defined area. Therefore, FIG. 1D shows that the node radio resource controller 54 of radio access node 22D comprises node automatic RAN-based notification area update logic 70, and terminal radio resource controller 56 of wireless terminal 26D comprises terminal automatic RAN-based notification area update logic 72.

In an implementation in which the first area information concerns tracking areas (TAs), for example, the wireless terminal knows that it is at a boundary of the pre-defined area when a wireless terminal notices a change in a tracking area code broadcast by the cell. The wireless terminal 26D preferably has a list of tracking area codes that may consist of multiple tracking areas. If the wireless terminal 26D changes from camping on a cell with a first tracking area code of the list to camping on a cell with a second tracking code of the list, the wireless terminal 26D must perform RAN-based notification area update (RNU) at the cell boundary. But if the camped on cell has a tracking area code that is not on the tracking area list, then the wireless terminal 26D must perform a tracking area update (TAU) to the core network (in essentially the same manner as done in LTE).

In the fourth example embodiment and mode, and in the case where the pre-determined area is a tracking area, without explicit update requirement signaling from the network the wireless terminal 26D always performs a RAN-based notification area update when crossing the boundary of a tracking area either (1) when ranAreaInformation includes no TrackingAreaCodeList or (2) when TrackingAreaCodeList is empty. On the other hand, if ranAreaInformation does include a non-empty TrackingAreaCodeList, this explicitly signaled TrackingAreaCodeList information may supersede the default configuration. The term "default configuration" refers to the automatic RAN-based notification area update (RAU), which means that if TrackingAreaCodeList is non-empty, the wireless terminal 26D may perform RAU at the boundary of the area defined in this IE, in accordance with the second example embodiment and mode, and may disable the automatic RAU at the TA boundary.

If the RAN-based notification area signaled from the network includes a list of cell identifications but no area identifications, the UE may form a RAN-based notification area by combining the cells in the cell list and the current TA. In this case, when crossing a tracking area boundary the UE may perform RAN-based notification area update if the new cell is not in the list of cell identifications, or may not do if the new camped cell is in the list.

5.0 Fifth Example Embodiment

Figure 1E:
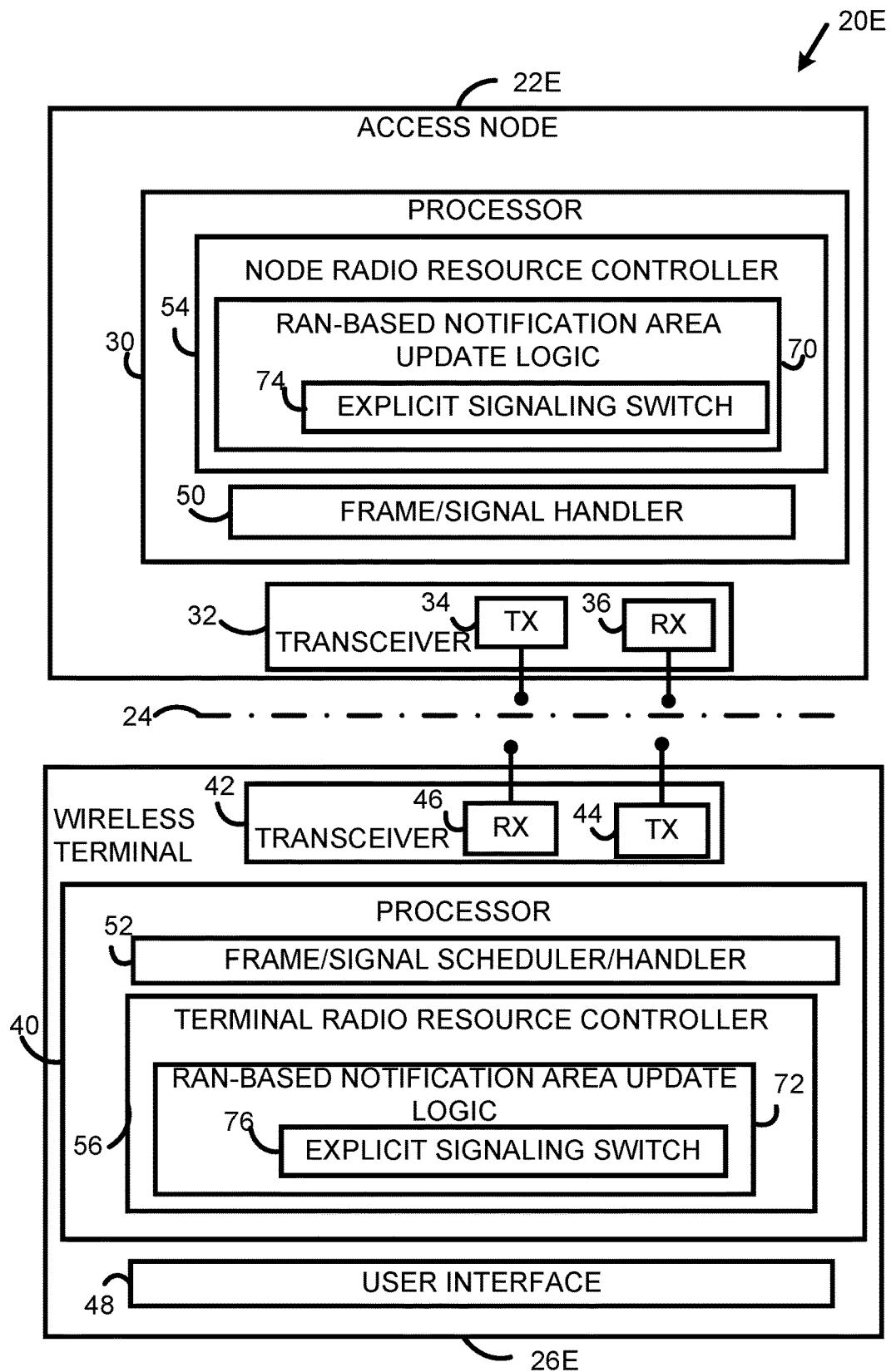

As indicated above, in the fifth example embodiment and mode there is an explicit signal to direct the wireless terminal to perform the RAN-based notification area update at a boundary of a pre-defined area. Therefore, FIG. 1E shows that the node radio resource controller 54 of radio access node 22E comprises node automatic RAN-based notification area update logic 70 with explicit signaling switch 74, and terminal radio resource controller 56 of wireless terminal 26D comprises terminal automatic RAN-based notification area update logic 72 with explicit signaling switch 76.

In the fifth example embodiment and mode, the switch (represented, e.g., in the radio access node 22E by switch 74 and in the wireless terminal 26E by switch 76) is provided to specify whether the procedure of the fourth example embodiment and mode is to be performed, or a procedure of the fifth example embodiment and mode. In an example implementation, the switch is an information element known as autoUpdateAtTA. In such example implementation, if a value (Boolean value) of the switch is TRUE or ON, then the procedure of the fourth example embodiment and mode is performed. In such situation (when the switch is TRUE), the TrackingAreaCodeList is likely not present, but in any event there is an automatic RAN-based notification area update on the TA code boundaries (except if a Tracking Area Update (TAU) is required at the boundary). Otherwise, if the value (Boolean value) of the switch is FALSE, then the procedure of the fifth example embodiment and mode is performed. When the switch is FALSE or OFF, then the wireless terminal 26E performs a RAN-based notification area update based on the area definition included in the first area information. Thus, in the fifth embodiment and mode, when the switch is FALSE or OFF, RAU is performed; (1) in accordance with the first embodiment and mode if the cell identity list is present in the first area information, (2) in accordance with the second embodiment and mode if the sub-area identification list is present in the first area information, or (3) in accordance with the third embodiment and mode if both the cell identity and the sub-area identification lists are present in the first area information.

In the fifth example embodiment and mode the network may explicitly signal via the switch (e.g., autoUpdateatTA) whether the UE performs the automatic RAN-based notification area update at a boundary of a pre-defined area. For example, if a tracking area is used as the pre-defined area, in one configuration the gNB may include the switch/Boolean field autoUpdateatTA in ranAreaInformation of RRCConnectionSuspend as shown below.

```
-- ASN1START
RRCConnectionSuspend ::=    SEQUENCE {
    criticalExtensions      CHOICE {
        c1                  CHOICE {
            rrcConnectionRelease    RRCConnectionSuspend-IEs,
            spare3 NULL, spare2 NULL, spare1 NULL
        },
        criticalExtensionsFuture    SEQUENCE { }
    }
}
RRCConnectionSuspend-IEs ::=    SEQUENCE {
    resumeIdentity          ResumeIdentity
    ranAreaInformation      RANAreaInformation
    nonCriticalExtension    RRCConnectionSuspend-vxyz-IEs OPTIONAL
}
ResumeIdentity ::=          BIT STRING (SIZE(40))
RANAreaInformation ::=      SEQUENCE {
    cellIdentityList        CellIdentityList           OPTIONAL
    autoUpdateAtTA          BOOLEAN
    trackingAreaCodeList    TrackingAreaCodeList       OPTIONAL
    nonCriticalExtension    RANAreaInformation-vxyz OPTIONAL
}
TrackingAreaCodeList
CellIdentityList::=     SEQUENCE (SIZE (1..128))OF CellIdentity
CellIdentity ::=        BIT STRING (SIZE (28))
TrackingAreaCodeList::=SEQUENCE(SIZE (1..8))OF TrackingAreaCode
TrackingAreaCode ::=    BIT STRING (SIZE (16))
-- ASN1STOP
```

When the wireless terminal 26E receives the message shown above, and if autoUpdateAtTA is set to TRUE, the wireless terminal 26E may perform RAN-based notification area update at the tracking area boundary, regardless of whether the trackingAreaCodeList is present. (In one configuration, when autoUpdateAtTA is set to TRUE, the optional field trackingAreaCodeList may be omitted). Similar to the fourth embodiment, the wireless terminal 26E may construct the RAN-based notification area by combining the current TA and the cells in CellIdentityList if it is present and non-empty. If autoUpdateAtTA is set to FALSE, then the wireless terminal 26E may follow the methods described in the embodiments disclosed earlier.

In another configuration, each gNB may include autoUpdateAtTA in a periodically broadcasted message, such as system information.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

Figure 13:
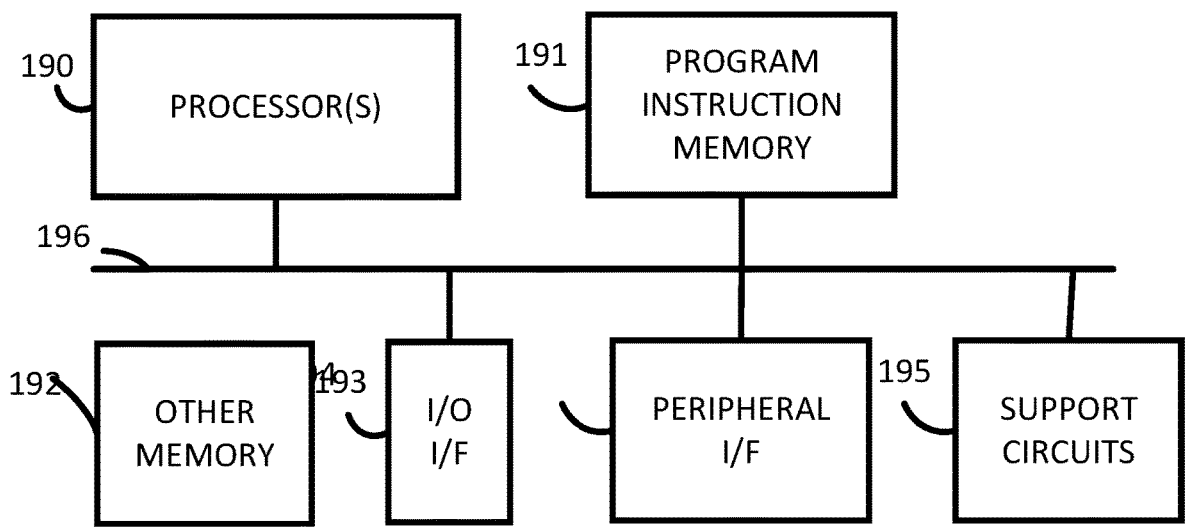
FIG. 13 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 13. FIG. 13 shows an example of such electronic machinery or circuitry, whether node or terminal, as comprising one or more processor(s) circuits 190, program instruction memory 191; other memory 192 (e.g., RAM, cache, etc.); input/output interfaces 193; peripheral interfaces 194; support circuits 195; and busses 196 for communication between the aforementioned units.

The program instruction memory 191 may comprise coded instructions which, when executed by the processor(s), perform acts including but not limited to those described herein. Thus is understood that each of node processor 30 and terminal processor 40, for example, comprise memory in which non-transient instructions are stored for execution.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

One or more of the following documents (all of which are incorporated herein by reference) may be relevant to the technology described herein:

The technology disclosed herein thus encompasses, but is not limited to, the following example embodiments and modes:

Example Embodiment 1

A wireless terminal comprising:
receiver circuitry and transmitter circuitry configured to communicate across a radio interface with a radio access node;
processor circuitry configured to:
establish a radio connection with radio access nodes;
receive from a radio access node an identification of connection context information;
in an inactivity state initiate an area update procedure upon moving out of a coverage area defined by a first area information.

Example Embodiment 2

The wireless terminal of example embodiment 1, wherein the connection context information includes security keys used for encryption and/or data integrity during the period of the radio connection.

Example Embodiment 3

The wireless terminal of example embodiment 1, wherein the area update procedure comprises the wireless terminal sending to the current serving radio access node a message including the identification of the connection context information.

Example Embodiment 4

The wireless terminal of example embodiment 1, wherein the first area information is provided by a radio access node.

Example Embodiment 5

The wireless terminal of example embodiment 4, wherein the first area information is provided in the message where the connection context information is present.

Example Embodiment 6

The wireless terminal of example embodiment 4, wherein the first area information comprises at least one cell identity.

Example Embodiment 7

The wireless terminal of example embodiment 4, wherein the first area information comprises at least one second area identification, where each cell under the control of the radio access node broadcasts a designated second area identification.

Example Embodiment 8

The wireless terminal of example embodiment 7, wherein the second area identification is a tracking area code.

Example Embodiment 9

The wireless terminal of example embodiment 7, wherein the first area information further includes at least one cell identification.

Example Embodiment 10

The wireless terminal of example embodiment 9, wherein the wireless terminal performs the area update procedure upon moving out of the coverage defined by the combination of the cell identifications and the second area identifications.

Example Embodiment 11

The wireless terminal of example embodiment 1, wherein the first area information is pre-determined.

Example Embodiment 12

The wireless terminal of example embodiment 11, wherein each tracking area is considered as a defined coverage of a first area information.

Example Embodiment 13

The wireless terminal of example embodiment 12, wherein the wireless terminal receives an indication from a radio access node indicating whether the area update procedure is to be performed when moving out of the coverage defined by the first area information.

Example Embodiment 14

The wireless terminal of any one of example embodiment 4 and example embodiment 11, wherein the wireless terminal combines both the first area information provided by the radio access node and the pre-defined first area information to define the coverage area for the area update procedure.

Example Embodiment 15

A radio access node comprising:
receiver circuitry and transmitter circuitry configured to communicate across a radio interface with a wireless terminal;
processor circuitry configured to:
establish a connection with a wireless terminal;
determine first area information as a paging coverage area for the wireless terminal in an inactive state;
send to the wireless terminal an identification of connection context information;
instruct the wireless terminal to enter the inactivity state;
receive and process an area update from the wireless terminal.

Example Embodiment 16

The radio access node of example embodiment 15, wherein the connection context information includes security keys used for encryption and data integrity during the period of the radio connection.

Example Embodiment 17

The radio access node of example embodiment 15, wherein the area update procedure comprises the radio access node receiving from the wireless terminal a message including the identification of the connection context information.

Example Embodiment 18

The radio access node of example embodiment 15, wherein the radio access node provides the wireless terminal the first area information.

Example Embodiment 19

The radio access node of example embodiment 18, wherein the first area information is provided in the message where the connection context information is present.

Example Embodiment 20

The radio access node of example embodiment 18, wherein the first area information comprises at least one cell identity.

Example Embodiment 21

The radio access node of example embodiment 18, wherein the first area information comprises at least one second area identification, where each cell under the control of the radio access node broadcasts a designated second area identification.

Example Embodiment 22

The radio access node of example embodiment 21, wherein the second area identification is a tracking area code.

Example Embodiment 23

The radio access node of example embodiment 21, wherein the first area information further includes at least one cell identification.

Example Embodiment 24

The radio access node of example embodiment 15, wherein the first area information is pre-determined.

Example Embodiment 25

The radio access node of example embodiment 24, wherein each tracking area is considered as a defined coverage of a first area information.

Example Embodiment 26

The radio access node of example embodiment 25, wherein the radio access node sends to the wireless terminal an indication indicating whether the area update procedure is to be performed when moving out of the coverage defined by the first area information.

Example Embodiment 27

A method in a wireless terminal comprising:
using receiver circuitry and transmitter circuitry configured to communicate across a radio interface with a radio access node;
using processor circuitry to:
establish a radio connection with radio access nodes;
receive from a radio access node an identification of connection context information;
in the inactivity state initiate an area update procedure upon moving out of the coverage area defined by first area information.

Example Embodiment 28

The method of example embodiment 27, wherein the connection context information includes security keys used for encryption and data integrity during the period of the radio connection.

Example Embodiment 29

The method of example embodiment 27, wherein the area update procedure comprises sending a message including the identification of the connection context information.

Example Embodiment 30

The method of example embodiment 27, wherein the first area information is provided by a radio access node.

Example Embodiment 31

The method of example embodiment 30, wherein the first area information is provided in the message where the connection context information is present.

Example Embodiment 32

The method of example embodiment 30, wherein the first area information comprises at least one cell identity.

Example Embodiment 33

The method of example embodiment 30, wherein the first area information comprises at least one second area identification, where each cell under the control of the radio access node broadcasts a designated second area identification.

Example Embodiment 34

The method of example embodiment 33, wherein the second area identification is a tracking area code.

Example Embodiment 35

The method of example embodiment 33, wherein the area information further includes at least one cell identification.

Example Embodiment 36

The method of example embodiment 35, wherein further performing the area update procedure upon moving out of the coverage defined by the combination of the cell identifications and the second area identifications.

Example Embodiment 37

The method of example embodiment 27, wherein the first area information is pre-determined.

Example Embodiment 38

The method of example embodiment 27, wherein each tracking area is considered as a defined coverage of a first area information.

Example Embodiment 39

The method of example embodiment 38, wherein further receiving an indication from a radio access node indicating whether the area update procedure is to be performed when moving out of the coverage defined by the first area information.

Example Embodiment 40

The method of any one of example embodiment 30 and example embodiment 37, wherein further combining both the first area information provided by the radio access node and the pre-defined first area information to define a aggregated coverage area for the area update procedure.

Example Embodiment 41

A method in a radio access node comprising:
using receiver circuitry and transmitter circuitry to communicate across a radio interface with a wireless terminal;
using processor circuitry to:
establish a connection with a wireless terminal;
determine first area information as a paging coverage area for the wireless terminal in an inactive state;
send to the wireless terminal an identification of connection context information;
instruct the wireless terminal to enter said inactivity state;
receive and process an area update from the wireless terminal.

Example Embodiment 42

The method of example embodiment 41, wherein the connection context information includes security keys used for encryption and data integrity during the period of the radio connection.

Example Embodiment 43

The method of example embodiment 41, wherein the area update procedure comprises receiving a message including the identification of the connection context information.

Example Embodiment 44

The method of example embodiment 41, wherein providing the first area information.

Example Embodiment 45

The method of example embodiment 44, wherein the first area information is provided in the message where the connection context information is present.

Example Embodiment 46

The method of example embodiment 44, wherein the first area information comprises at least one cell identity.

Example Embodiment 47

The method of example embodiment 44, wherein the first area information comprises at least one second area identification, where each cell under the control of the radio access node broadcasts a designated second area identification.

Example Embodiment 48

The method of example embodiment 44, wherein the second area identification is a tracking area code.

Example Embodiment 49

The method of example embodiment 44, wherein the first area information further includes at least one cell identification.

Example Embodiment 50

The method of example embodiment 41, wherein the first area information is pre-determined.

Example Embodiment 51

The method of example embodiment 50, wherein each tracking area is considered as a defined coverage of a first area information.

Example Embodiment 52

The method of example embodiment 51, wherein further sending an indication indicating whether the area update procedure is to be performed when moving out of the coverage defined by the first area information.

Example Embodiment 53

A wireless terminal that communicates with a radio access node, comprising;

receiver circuitry configured to receive, from the radio access node, a Radio Resource Control (RRC) message comprising information configuring a Radio Access Network-based (RAN-based) notification area, and;

processor circuitry configured to initiate, in a case where the wireless terminal is in an inactive state, a RAN-based notification area update procedure upon the wireless terminal moving out of the configured RAN-based notification area;

wherein the information configuring the RAN-based notification area comprises one or more tracking area codes, each of the one or more tracking area codes being used to identify a tracking area.

Example Embodiment 54

The wireless terminal of Example Embodiment 53, wherein the receiver circuitry is configured to receive the RRC message comprising the information configuring the RAN-based notification area and a second information, the second information being configured to instruct the wireless terminal to transition from a connected state to the inactive state.

Example Embodiment 55

The wireless terminal of Example Embodiment 53, wherein the receiver circuitry is configured to receive a system information message comprising a tracking area code used to determine whether or not the wireless terminal moves out of the configured RAN-based notification area.

Example Embodiment 56

The wireless terminal of Example Embodiment 55: wherein the processor circuitry is configured to perform, upon receiving the system information message comprising the tracking area code, a tracking area update for a core network.

Example Embodiment 57

A radio access node that communicates with a wireless terminal, comprising;

transmitter circuitry configured to transmit, to the wireless terminal, a Radio Resource Control (RRC) message comprising information configuring a Radio Access Network-based (RAN-based) notification area;

receiver circuitry configured to receive, from the wireless terminal, a RAN-based notification area update based on the configured RAN-based notification area, wherein the wireless terminal is in an inactive state, and;

processor circuitry configured to process the received RAN-based notification area update, wherein the information configuring the RAN-based notification area comprises one or more tracking area codes, each of the one or more tracking area codes being configured to identify a tracking area.

Example Embodiment 58

The radio access node of Example Embodiment 57, wherein the transmitter circuitry is configured to transmit the RRC message comprising the information configuring the RAN-based notification area and a second information, the second information being used to instruct the wireless terminal to transition from a connected state to the inactive state.

Example Embodiment 59

The radio access node of Example Embodiment 57, wherein the transmitter circuitry is configured to transmit a system information message comprising a tracking area code used by the wireless terminal to determine whether or not the wireless terminal moves out of the configured RAN-based notification area.

Example Embodiment 60

The radio access node of Example Embodiment 59, wherein the receiver circuitry is configured to receive, from the wireless terminal, a tracking area update for a core network, based on the system information message comprising the tracking area code.

Example Embodiment 61

A method for a wireless terminal that communicates with a radio access node, comprising;

receiving, from the radio access node, a Radio Resource Control (RRC) message comprising information configuring a Radio Access Network-based (RAN-based) notification area, and;

initiating, in a case where the wireless terminal is in an inactive state, a RAN-based notification area update procedure upon the wireless terminal moving out of the configured RAN-based notification area;

wherein the information configuring the RAN-based notification area comprises one or more tracking area codes, each of the one or more tracking area codes being used to identify a tracking area.

Example Embodiment 62

The method of Example Embodiment 61, wherein receiving the RRC message comprising the information configuring the RAN-based notification area and a second information, the second information being used to instruct the wireless terminal to transition from a connected state to the inactive state.

Example Embodiment 63

The method of Example Embodiment 61, wherein receiving a system information message comprising a tracking area code used to determine whether or not the wireless terminal moves out of the configured RAN-based notification area.

Example Embodiment 64

The method of Example Embodiment 63, wherein performing, upon receiving the system information message comprising the tracking area code, a tracking area update for a core network.

Example Embodiment 65

A method for a radio access node that communicates with a wireless terminal, comprising;

transmitting, to the wireless terminal, a Radio Resource Control (RRC) message comprising information configuring a Radio Access Network-based (RAN-based) notification area;

receiving, from the wireless terminal, a RAN-based notification area update based on the configured RAN-based notification area, wherein the wireless terminal is in an inactive state, and;

processing the received RAN-based notification area update;

wherein the information configuring the RAN-based notification area comprises one or more tracking area codes, each of the one or more tracking area codes being used to identify a tracking area.

Example Embodiment 66

The method of Example Embodiment 65, wherein transmitting the RRC message comprising the information configuring the RAN-based notification area and a second information, the second information being configured to instruct the wireless terminal to transition from a connected state to the inactive state.

Example Embodiment 67

The method of Example Embodiment 65, wherein transmitting a system information message comprising a tracking area code used by the wireless terminal to determine whether or not the wireless terminal moves out of the configured RAN-based notification area.

Example Embodiment 68

The method of Example Embodiment 67, wherein receiving, from the wireless terminal, a tracking area update for a core network, based on the system information message comprising the tracking area code.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A terminal apparatus that communicates with a base station apparatus, comprising:
   receiver circuitry configured to
      receive a first list during a registration procedure with a core network, the first list being used to identify an area for a tracking area update procedure for the core network, and
      receive, from the base station apparatus, a Radio Resource Control (RRC) message comprising a second list, the second list being used to identify a Radio Access Network-based (RAN-based) notification area; and
   processor circuitry configured to perform, in a case where the terminal apparatus is in RRC_INACTIVE state, the RAN-based notification area update procedure upon the terminal apparatus moving out of the RAN-based notification area, wherein
      Access Stratum (AS) context is stored during the RRC_INACTIVE state, and
      the first list and the second list are specified by a first set of one or more tracking area codes and a second set of one or more tracking area codes respectively.

2. The terminal apparatus of claim 1, wherein
   the receiver circuitry is configured to receive the RRC message comprising information used to instruct the terminal apparatus to transit from RRC_CONNECTED state to the RRC_INACTIVE state.

3. The terminal apparatus of claim 1, wherein
   the receiver circuitry is configured to receive a system information message comprising a tracking area code used to determine whether or not the terminal apparatus moves out of the RAN-based notification area.

4. The terminal apparatus of claim 3, wherein
   the processor circuitry is configured to use the tracking area code for the tracking area update for the core network.

5. A base station apparatus that communicates with a terminal apparatus, comprising:
   transmitter circuitry configured to
      transmit a first list during a registration procedure with a core network, the first list being used to identify an area for a tracking area update procedure for the core network, and
      transmit, to the terminal apparatus, a Radio Resource Control (RRC) message comprising a second list, the second list being used to identify a Radio Access Network-based (RAN-based) notification area;
   receiver circuitry configured to receive, from the terminal apparatus, a RAN-based notification area update upon the terminal apparatus moving out of the RAN-based notification area, in a case where the terminal apparatus is in RRC_INACTIVE state; and
   processor circuitry configured to process the received RAN-based notification area update, wherein
      Access Stratum (AS) context is stored during the RRC_INACTIVE state, and
      the first and the second list are specified by a first set of one or more tracking area codes and a second set of one or more tracking area codes respectively.

6. The base station apparatus of claim 5, wherein
   the transmitter circuitry is configured to transmit the RRC message comprising information used to instruct the terminal apparatus to transit from RRC_CONNECTED state to the RRC_INACTIVE state.

7. The base station apparatus of claim 5, wherein
the transmitter circuitry is configured to transmit a system information message comprising a tracking area code used by the terminal apparatus to determine whether or not the terminal apparatus moves out of the RAN-based notification area.

8. The base station apparatus of claim 7, wherein
the receiver circuitry is configured to receive, from the terminal apparatus, the tracking area code for the tracking area update for the core network.

9. A method for a terminal apparatus that communicates with a base station apparatus, comprising:
receiving a first list during a registration period with a core network, the first list being used to identify an area for a tracking area update procedure for the core network;
receiving, from the base station apparatus, a Radio Resource Control (RRC) message comprising a second list, the second list being used to identify a Radio Access Network-based (RAN-based) notification area; and
performing, in a case where the terminal apparatus is in RRC_INACTIVE state, the RAN-based notification area update procedure upon the terminal apparatus moving out of the RAN-based notification area, wherein
Access Stratum (AS) context is stored during the RRC_INACTIVE state, and
the first and the second list are specified by a first set of one or more tracking area codes and a second set of one or more tracking area codes respectively.

10. The method of claim 9, further comprising:
receiving the RRC message comprising information used to instruct the terminal apparatus to transit from RRC_CONNECTED state to the RRC_INACTIVE state.

11. The method of claim 9, further comprising:
receiving a system information message comprising a tracking area code used to determine whether or not the terminal apparatus moves out of the RAN-based notification area.

12. The method of claim 11, further comprising:
using the tracking area code for the tracking area update for the core network.

13. A method for a base station apparatus that communicates with a terminal apparatus, comprising:
transmitting a first list during a registration procedure with a core network, the first list being used to identify an area for a tracking area update procedure for the core network;
transmitting, to the terminal apparatus, a Radio Resource Control (RRC) message comprising a second list, the second list being used to identify a Radio Access Network-based (RAN-based) notification area;
receiving, from the terminal apparatus, a RAN-based notification area update upon the terminal apparatus moving out of the RAN-based notification area, in a case where the terminal apparatus is in RRC_INACTIVE state; and
processing the received RAN-based notification area update; wherein
Access Stratum (AS) context is stored during the RRC_INACTIVE state, and
the first and the second list are specified by a first set of one or more tracking area codes and a second set of one or more tracking area codes respectively.

14. The method of claim 13, further comprising:
transmitting the RRC message comprising information used to instruct the terminal apparatus to transit from RRC_CONNECTED state to the RRC_INACTIVE state.

15. The method of claim 13, further comprising:
transmitting a system information message comprising a tracking area code used by the terminal apparatus to determine whether or not the terminal apparatus moves out of the RAN-based notification area.

16. The method of claim 15, further comprising:
receiving, from the terminal apparatus, the tracking area code for the tracking area update for the core network.

* * * * *